(12) United States Patent
Murray

(10) Patent No.: US 7,061,630 B2
(45) Date of Patent: Jun. 13, 2006

(54) SYSTEM ARCHITECTURE AND METHOD FOR VERIFYING PROCESS CORRECTNESS IN A DOCUMENT PROCESSING SYSTEM

(75) Inventor: Daniel M. Murray, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 1049 days.

(21) Appl. No.: 09/738,574

(22) Filed: Dec. 15, 2000

(65) Prior Publication Data

US 2002/0075505 A1    Jun. 20, 2002

(51) Int. Cl.
*G06F 15/00* (2006.01)

(52) U.S. Cl. ............ 358/1.12; 358/1.2; 358/1.17; 358/1.18; 358/405; 358/501; 358/1.9; 382/112; 347/19; 347/216

(58) Field of Classification Search ........... 358/1.12, 358/296, 406, 504, 1.9, 501, 405; 347/156; 399/31, 46, 51, 66, 53; 382/112
See application file for complete search history.

(56) References Cited

U.S. PATENT DOCUMENTS

| | | | |
|---|---|---|---|
| 4,248,520 A * | 2/1981 | Kurita et al. ............... 399/92 |
| 4,689,737 A | 8/1987 | Grant |
| 4,724,521 A | 2/1988 | Carron et al. |
| 4,849,821 A * | 7/1989 | Allen et al. .............. 358/405 |
| 5,057,936 A * | 10/1991 | Bares ....................... 358/405 |
| 5,418,888 A | 5/1995 | Alden |
| 5,471,313 A | 11/1995 | Thieret et al. ........... 358/296 |
| 5,594,840 A | 1/1997 | Sahay et al. |
| 5,629,775 A | 5/1997 | Platteter et al. .......... 358/296 |
| 5,659,746 A * | 8/1997 | Bankert et al. ........... 707/205 |
| 5,712,921 A * | 1/1998 | Zabele ...................... 382/112 |
| 5,717,978 A | 2/1998 | Mestha ........................ 399/46 |
| 5,754,918 A | 5/1998 | Mestha et al. ............. 399/48 |
| 5,768,485 A * | 6/1998 | Shimizu ................... 358/1.17 |
| 5,884,118 A | 3/1999 | Mestha et al. ............. 399/15 |
| 5,950,040 A | 9/1999 | Mestha et al. ............. 399/46 |
| 5,974,202 A | 10/1999 | Wang et al. |
| 6,021,285 A | 2/2000 | Mestha et al. ............. 399/9 |
| 6,292,270 B1 * | 9/2001 | Schwarz et al. .......... 358/1.9 |
| 6,449,385 B1 * | 9/2002 | Huber et al. .............. 382/112 |
| 6,567,179 B1 * | 5/2003 | Sato et al. ............... 358/1.15 |

OTHER PUBLICATIONS

EP 01 12 9432, Jan. 19, 2004, The Hague.

* cited by examiner

*Primary Examiner*—Joseph R. Pokrzywa
*Assistant Examiner*—Mark R. Milia
(74) *Attorney, Agent, or Firm*—Fay, Sharpe, Fagan, Minnich & McKee, LLP

(57) ABSTRACT

A document processing system is provided that renders digital image data in individual pages, where each individual page is rendered to a bitmap page and a corresponding control string. The system includes a system architecture with a control channel for communicating and synchronizing the control strings at one or more process stations in an image output terminal (IOT). Further, the system architecture includes a cross channel rendering technique ("dual rendering") for constructing the control string in such a manner as to verify process correctness at one or more process station. In addition, a method is provided for setting up and controlling one or more process stations prior to normal operations. Still another method is provided for controlling one or more process stations during normal operations. Finally, a method is provided for archiving documents in an archive station during normal operations for potential retrieval and reference at a later date.

21 Claims, 16 Drawing Sheets

SYSTEM ARCHITECTURE AND METHOD FOR VERIFYING PROCESS CORRECTNESS IN A DOCUMENT PROCESSING SYSTEM

FIELD OF THE INVENTION

The present invention relates generally to a document processing system and, more particularly, to a system architecture and a method for verifying the correctness of various document processing processes in a digital print system.

BACKGROUND OF THE INVENTION

Document processing systems refer to a set of devices that construct, produce, print, translate, store, and archive documents and their constituent elements. Such devices include printers, scanners, fax machines, electronic libraries, and the like. The present invention addresses situations particularly relevant to printing systems and discusses them as the prime example of a document processing system, but the present invention should not be construed to be limited to any such particular printing application. Any document processing system is intended to benefit from the advantages of this invention.

A digital print system renders a digital image, consisting of electronic data, to a human readable document comprised of one or more printed pages. Digital print systems typically include: 1) a print controller and 2) an image output terminal ("IOT"). The print controller may receive electronic data for a print job from various sources, including an individual computer, a distributed computer network, an electronic storage device, a scanner, or any other device capable of communicating the data to the print controller. The print controller may also generate electronic data for a print job. Regardless of the source of the electronic data, the print controller translates it to digital image data compatible with the IOT and transmits the digital image data to the IOT. The print controller also controls operations within the IOT. The IOT is typically further comprised of one or more feeding stations, a print engine with a plurality of imaging stations, and one or more finishing stations. Such feeding stations, imaging stations, and finishing stations can generally be referred to as processing stations.

Digital print systems are well known to the fields of incremental printing of symbolic information, photocopying, facsimile, and electrophotography. Digital print systems are also referred to by many technical and commercial names within these fields, including: electrophotographic printers, copiers, and multifunction peripherals; xerographic printers, copiers, and multifunction peripherals; digital presses; laser printers; ink-jet printers; and thermal printers. Examples of some recent patents relating to digital print systems include Xerox Corporation U.S. Pat. Nos. 5,629, 775, 5,471,313, and 5,950,040.

U.S. Pat. No. 5,629,775, incorporated herein by reference, discloses an electronic image processing apparatus having a marking machine, a source of copy sheets, a controller, and a plurality of resources wherein each of the resources includes an associated processor for storing data related to the operational timing of the associated resource. A bus interconnects the processors to the controller for directing the operation of the image processing apparatus to provide images on the copy sheets and the controller includes circuitry for interrogating each of the processors for the operational timing data and logic for responding to the operational timing data of each of the processors for dynamically configuring the controller to operate in accordance with the operational timing of the processors.

U.S. Pat. No. 5,471,313, incorporated herein by reference, uses a control system for an IOT with a hierarchical structure that isolates subsystem controls for purposes of efficient algorithm design, analysis and implementation. The architecture is divided into three levels and has a controls supervisor that provides subsystem isolation functions and reliability assurance functions. The architecture improves image quality of IOT outputs by controlling the operation of the IOT to insure that a tone reproduction curve of an output image matches a tone reproduction curve of an input image, despite several uncontrollable variables which change the tone reproduction curve of the output image.

U.S. Pat. No. 5,950,040, incorporated herein by reference, discloses a feedback control system that controls developability of a xerographic imaging device using optical sensors for measuring development values based on an expected target value. The feedback control system includes a controller device and a feed-forward device. The controller device includes an input summing node, a gain device, an integrator and a nominal summing node which are serially connected in communication with each other. The input summing node, the gain device and the integrator are operative in combination with each other to receive and process the measured value and the target value to provide a new corrected actuator value to the integrator summing node. The feed-forward device is connected to the nominal summing node and receives and responds to the target value to output a nominal actuator value to the nominal summing node. The nominal summing node combines the new corrected actuator value and the nominal actuator value to provide an actuator value to the xerographic imaging device for controlling the developability of the xerographic imaging device. A method for controlling developability of a xerographic imaging device is also described.

The ultimate goals of any digital print system are to deliver outstanding print quality in both black and color output, to reliably printjobs exploiting the capabilities of the print system, to minimize waste and downtime, and to accomplish these goals by consistently and automatically performing repetitive document processing functions. A comprehensive approach to addressing these goals would be to adopt a system architecture and a method for verifying the correctness of various document processing processes in the digital print system. Such an approach could address correctness, quality, and efficiency in each phase of document processing in a common manner. For example, problems related to: 1) verifying the integrity of documents prior to distribution, 2) establishing correct operational set points for the digital print system, and 3) supporting the retrieval and reconstruction of documents after distribution—could be simultaneously solved by this comprehensive approach. The following paragraphs identify current problems in each of these three areas and corollary needs for improvements.

First, problems regarding verifying the integrity of documents prior to distribution are addressed. The popularity of personalizing short documents produced by a digital print system, often in high volume for numerous people, by merging data from a computerized database with a digital form has increased the importance of verifying document integrity and the need to warrant that a digital print system correctly processes documents. This entails not only ensuring that the actual sequence of printed pages corresponds to the intended page sequence for the job, but also includes verification that the image printed on each page matches the desired image content for the page. More specifically, document integrity includes verifying: 1) the document does not contain duplicate pages, 2) the document is not missing pages, 3) the pages of the document are in the proper order, 4) the printed image matches the desired image content, 5) undesired duplicate documents were not produced, 6) no desired documents are missing, and 7) documents are in the proper order.

Some digital print systems currently depend on manual verification of document integrity. Examples of manual verification include: a) personalized print jobs where each page contains a person's name and/or identification number and operators manually verify that the document pages are for the correct person, that they are in the proper sequence, and that the correct document is matched with a personalized envelope and b) printing books on demand, including printing a single book, where the entire book is manually inspected after it is completely bound. In either example, the manual inspection operation is labor intensive and performed at a time when identification of a defect results in a complete rerun and significant loss of time and profit.

Current attempts to automate verification of document integrity are well short of the efficiency and flexibility needed for digital print systems. To date, such attempts are based on standardized reference parameters, are relatively inflexible, and are not sensitive to the unique content of a given document. This severely limits the ability of the digital print system to adapt to the diverse range of documents being produced and presented for processing in today's information intensive environment. Typically, automated recognition and verification equipment in such digital print systems operate with little or no knowledge of the content of the document or the expected imaging result from processing the document. In the personalized print job example, suppose the inspection process is automated. Further, suppose the recognition equipment recognizes that the person's name and identification number on the document is "Name/1234". With only this information, there is no way of determining the complete "truth," i.e., whether this page has the correct predecessor and successor pages and whether it is matched with the correct envelope. Of course, the automated inspection process might be enriched to include these additional verification steps. For example, by looking for "Name/1234, Page 2 of 4" and using a built-in counter to assure that consecutive sheets are delivered with the same name and identification the digital print system could verify the integrity of the sequence of each page of the document. However, this achieves only a partial solution and is ad hoc, tremendously inflexible, and not closed loop with respect to the print job.

Consequently, a need exists for a digital print system architecture that enables verification of document integrity during the printjob with an improved degree of flexibility from document to document. Furthermore, a need also exists to extend such document integrity verification capabilities to any printjob which may be performed on the digital print system with an improved degree of flexibility from print job to print job.

Next, problems regarding setting up the digital print system are addressed. In order to maintain each station of the digital print system at certain quality standards, setup procedures are usually performed after installation, after a certain period of operation, and after certain maintenance procedures, particularly for imaging stations within the print engine. Color print engines, for example, require setup procedures to maintain color image quality and consistent repeatability from job to job. The setup procedures commonly employed by color print engines include: 1) a calibration process, 2) closed-loop imaging station control, and 3) print engine profiling.

First, under the calibration process, color print engines typically adjust and align imaging stations of each of the multiple color separations. In general, the calibration process for color print engines typically involves one or more print/adjust cycles, each cycle usually consisting of four steps: 1) printing one or more test targets, 2) measuring the test target with a sensor, 3) adjusting print controller imaging or one or more imaging stations of the print engine based on differences between measured and expected values, and 4) updating print controller tables.

Second, closed-loop imaging station control involves printing one or more standard or pre-programmed color test targets, measurement of certain parameters of the printed test targets, and image station tuning based on differences between measured values and the expected values for the test targets. Frequently, such test targets and closed-loop controls work on the cyan (C), magenta (M), yellow (Y), and black (K) imaging channels independently.

Finally, color printers carry the special requirement of publicizing their color capabilities in a standard format known as an International Color Consortium (ICC) profile. Such profiles define the imaging results of various mixes of multiple color separations in the print controller/print engine combination. This is accomplished through print engine profiling, where the profile is made by measuring printed color test targets, computing color correction factors, and storing such factors in ICC profile format. Profiling differs from calibration because it simply describes the current print engine state without attempting to adjust or tune imaging stations to comply with nominal "factory" imaging standards.

In all three cases, the trend is to automate setup procedures in order to reduce the operator skills required for processing production color documents. Density and color measuring devices and comparators to compare measured values to pre-established reference values or values stored in lookup tables are commonly included in advanced print engine designs to facilitate automation. However, a digital print system architecture that enables the source of the test target image to serve the dual function of acting as the reference for expected values being compared to measured values of the image actually printed would simplify print engine setup procedures and the overall system design supporting such procedures. Consequently, a need exists for a digital print system architecture that enables simplified print engine setup procedures to be employed and reduces the complexity of the overall system design supporting such procedures.

Finally, problems regarding verifying integrity of documents after distribution are addressed. Digital print systems that produce printed documents by employing variable print and last second merging of data with digital forms frequently are required to keep a digital copy of the resulting document set. This is required to accommodate subsequent reference to the processed document, such as the "customer service" problem in which a customer calls to question some aspect of an account statement or other personalized document that was printed by merging personalized data with a standardized form. Without a copy of the customer's personalized document, a customer service representative can only access the customer's database record as of the time of the inquiry. This can lead to confusion if there is no audit trail in paper files or electronic media indicating that the customer's personalized document was actually generated and mailed.

Image filing mechanisms have been instituted to solve this problem. However, current image filing mechanisms typically involve multiple digital print system add-on components and are often prone to operator errors due to the complex interactions required to regenerate the customer's personalized document. Consequently, a need exists for a digital print system architecture that enables simplified electronic archive and retrieval operations to validate and possibly regenerate previously distributed documents.

BRIEF SUMMARY OF THE INVENTION

The present invention provides a document processing system comprising 1) a controller for rendering image data for a document to be imaged in individual pages, wherein each individual page is rendered to a bitmap page and a corresponding control string, 2) an image output terminal for performing a plurality of processes to image the bitmap page and for verifying the correctness of one or more of such processes using the control string, 3) an image channel for communicating the bitmap page from the controller to the image output terminal, and 4) a control channel for communicating the control string from the controller to the image output terminal.

The present invention also provides a digital print system that renders image data for a document to be printed in individual pages, where each individual page is rendered to both a bitmap page and a control string.

The present invention also provides a system architecture with a control channel for communicating and synchronizing the control strings with one or more process stations within an image output terminal of the digital print system.

An advantage of the present invention is that it provides an improved method for verification of process correctness, including verification of image, page, and/or document integrity, at one or more process stations within an image output terminal of the digital print system.

Another advantage of the present invention is that it provides an improved method for establishing and maintaining a prescribed set point for one or more process stations within an image output terminal of the digital print system prior to normal print operations.

Another advantage of the present invention is that it provides an improved method for controlling one or more process stations within an image output terminal of the digital print system during normal print operations.

Another advantage of the present invention is that it provides an improved method for archiving printed documents during normal print operations of the digital print system for potential retrieval and reference at a later time.

BRIEF DESCRIPTION OF THE DRAWINGS

Other aspects of the present invention will become apparent from its description and upon reference to the drawings provided. However, the drawings are only for purposes of illustrating embodiments of the present invention and are not to be construed as limiting the present invention.

FIGS. 4a through 4d show several embodiments for a generic process station. FIG. 4e shows an embodiment for a specific type of process station, known as an archive station.

DETAILED DESCRIPTION OF THE INVENTION

Figure 1:
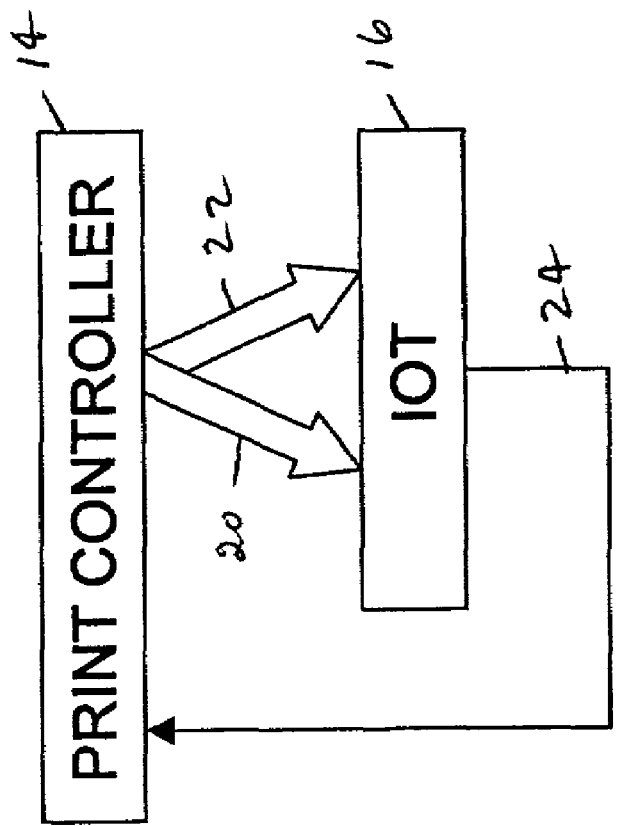
FIG. 1 shows a block diagram of a digital print system incorporating features of the present invention.

In describing the present invention, the following terms have been used:

"Analog page" refers to page image representations after the image is converted from digital image data or bitmap data to a latent image or a printed image.

"Bitmap page" refers to a page image representation in electronic form, where the image is defined by digital bitmap data comprised of a number of individual pixels.

"Control channel" refers to a communication channel used to carry programmable byte strings, also referred to as control strings, from a print controller of a digital print system to an image output terminal within the system and to one or more process stations within the image output terminal.

"Control string" refers to a programmable byte string of varying length and composition containing embedded commands and image content associated with a page image representation. A control string is accumulated during the same conversion and rendering process that is used for the bitmap page. Once completed, a particular control string and its associated bitmap page (or its analog page representation) remain linked and synchronized throughout the printing process.

"Dual rendering" or "dual channel rendering" is a generalized image rendering method in which each print object undergoes two conversions: a first conversion to a bitmap image suitable for the image channel and, optionally, a second conversion suitable for the control channel. The second conversion is intended to result in an encoded, non-image form of the print object or its attributes such as position, geometry, color content s or similar descriptors which are to be interpreted by a downstream process station.

"Image channel" refers to the path of a page image representation in a digital print system. The path originates at a print controller and flows to and through an image output terminal of a digital print system. The page image representation begins as a bitmap page in the print controller, is converted to an analog page in the image output terminal, and is ultimately transferred to a page of stock.

"Image rendering" or "rendering" is a conversion process by which a print object—graphic, text, picture, chart, geometric drawing, illustration, or other digital form—is converted to a visually equivalent bitmap image suitable for printing on a target device.

"Imaging station" refers to any process station within the print engine of an image output terminal in a digital print system. For example, imaging and exposing stations, photoreceptors, developing stations, transferring stations, and fusing stations are generically referred to as imaging stations.

"Page-level synchronization" refers to a data and control signal transfer process which commences transfers only at the beginning of an IOT page imaging cycle and which completes the entire transfer before the end of that same cycle.

"Page normalization" is the process of collecting and making local to the print system all resources, print objects, images, and instructions of any and all kinds that are necessary to print a given page and job. Normalization may involve acquiring input from network resources or other media and devices.

"Process station" refers to any process station within the image output terminal in a digital print system. For example, imaging stations, feeding stations, finishing stations, and archive stations are generically referred to as process stations.

Figure 2:
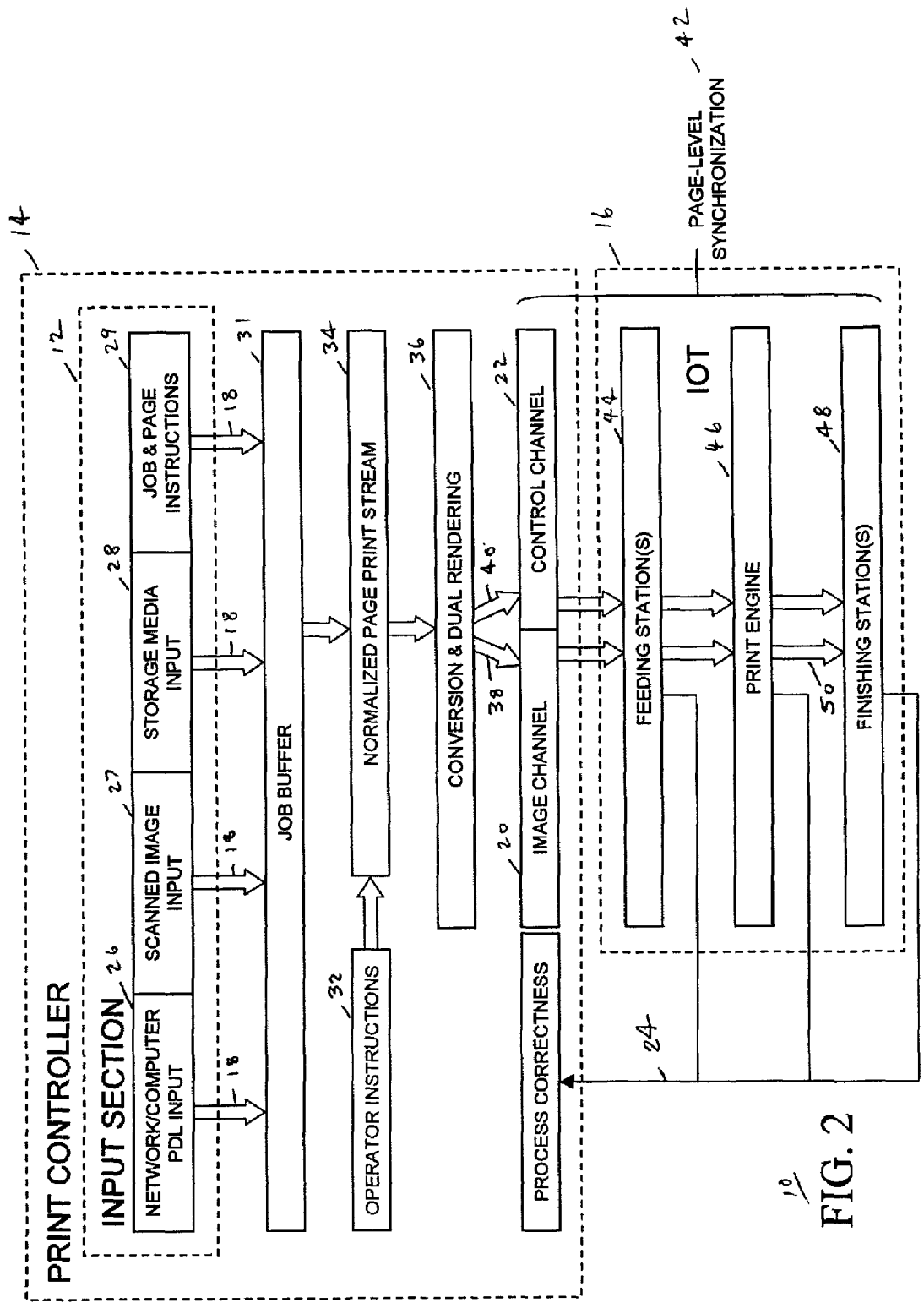
FIG. 2 shows a chart depicting the general flow of image data through the digital print system of FIG. 1.

Turning now to the drawings, where like numerals designate like components, FIG. 1 is a block diagram of a digital print system 10 that incorporates features of the present invention and FIG. 2 is a chart depicting the general flow of image data through the digital print system 10. The digital print system 10 is comprised of a print controller 14 and an image output terminal (IOT) 16. The digital print system 10 processes documents by sequentially processing each page of the document and is also known as a document printer. The print controller 14 includes an input section 12 through which it receives input data to be printed along with either embedded or accompanying job and page instructions 29. The input section 12 may receive input data from an individual computer, distributed computer network, scanner, electronic storage device, and any device capable of generating, translating, or storing digital image data. The input section 12 initiates a print job by distributing the received input to the remaining portions of the print controller 14. The input section 12 distributes the input data as a digital print stream 18. Where the source of the input data is an individual computer or a distributed computer network, the digital print stream 18 is a page description language (PDL) and provided to the input section via a network/computer PDL input 26. Job and page instructions 29 are embedded in the PDL and may also be provided separate from the PDL in the digital print stream 18. Any type of PDL is commonly known to describe the layout and content of a document in terms of the pages comprising the document in a format compatible with digital print systems. Hewlett Packard's Printer Control Language (PCL) and Adobe PostScript are two common types of PDL. Where the source of the input data is a scanner, the digital image data is in raster bitmap form and provided via a scanner image input 27. Job and page instructions 29 may accompany the scanner image input 27 or may be entered manually in the digital print stream 18. Where the source of the digital image data is a storage device, e.g., a floppy disk drive, the digital image data is provided to the controller 14 from a storage media input 28, e.g., a floppy disk. The digital image data from the storage media input 28 may be in PDL form or raster bitmap form and may also be accompanied by job and page instructions 29.

The job buffer 31 in the print controller 14 receives the digital print stream 18 from the input section 12. The print controller 14 combines the digital print stream 18 and any further operator instructions 32 received from the print controller's user interface in a page normalization process which creates a normalized page print stream 34. The print controller 14 performs conversion and dual rendering 36 of the normalized page print stream 34 to two information channels, one being an image channel 20 and the other a control channel 22. The image channel 20 carries a stream of bitmap pages 38. The control channel 22 carries a stream of programmable byte strings, also known as control strings 40. The image channel 20 and control channel 22 are both provided to the IOT 16.

A unique control string 40 is associated with each bitmap page 38 carried in the image channel 20. Each control string 40 provides the IOT 16 with a dynamic reference, generated from the same digital source data (i.e., normalized page print stream 34) as the bitmap page 38, with which to verify the correctness of the bitmap page 38 or its analog page 50 representation during subsequent processing. The IOT is comprised of a plurality of process stations, commonly including one or more feeding stations 44, at least one print engine 46 with a plurality of imaging stations, and one or more finishing stations 48. It is contemplated that the integrity of the image channel 20 at the output of any one process station (e.g., feeding station 44, imaging station within the print engine 46, or finishing station 48), multiple process stations, or all process stations can be verified as the bitmap page 38 or its analog page 50 representation advance through the IOT 16 to provide both an indication of the correctness of one or more previous processes and the current integrity of the page or document. This is possible through page-level synchronization 42 of the bitmap page 38 (and, subsequently, its analog page 50 representation) with its corresponding control string 40 in the image channel 20 and control channel 22, respectively, at the particular process station where process correctness and/or image integrity is to be verified.

Verification of the image channel 20 at any one process station is accomplished by detecting the condition of the page in the image channel 20 at the output of the process station, verifying that the detected page condition matches the control string "truth" from the control channel 22, and providing a process correctness signal 24 to the print controller 14 indicative of whether the output of the image channel 20 at the process station is "correct." The process correctness signal 24 permits the print controller 14 to continue document processing with confidence of the integrity of the document or to implement corrective process control measures, including purging the mismatched pages while preserving all previous pages where image integrity was properly confirmed. The print controller 14 may also use the process correctness signal 24 in developing a print job status signal to provide the devices supplying input data for printjobs with specific notice of certain events as they occur during print job processing and/or with access to monitor the current condition of the print job.

Figure 3:
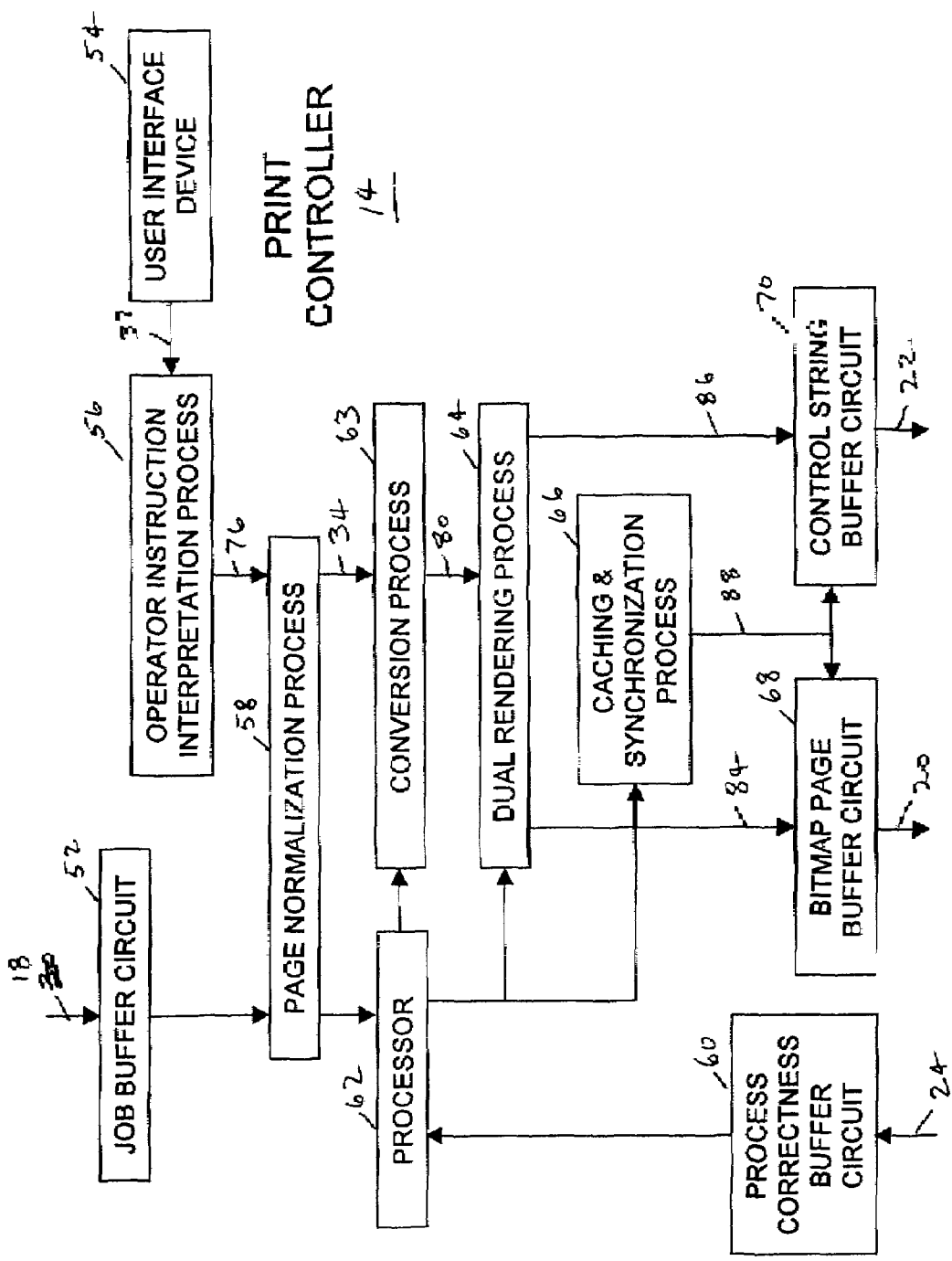
FIG. 3 shows a block diagram of a print controller within the digital print system of FIG. 1.

Referring to FIG. 3, where like numerals designate like components, a block diagram of the print controller 14 of FIG. 1 is shown. The print controller 14 is comprised of a job buffer circuit 52, a user interface device 54, a operator instruction interpretation process 56, a page normalization process 58, a process correction buffer circuit 60, a processor 62, a page normalization print stream conversion process ("conversion process") 63, a dual rendering process 64, a caching and synchronization process 66, a bitmap page buffer circuit 68, and a control string buffer circuit 70. The job buffer circuit 52 receives digital image data and job and page instructions 29 via the digital print stream 18 from the input section 12. The digital image data may be in PDL form or raster bitmap form depending on the source (e.g., network/computer PDL input 26, scanned image input 27, or storage media input 28). The job and page instructions 29 are embedded in the PDL and may also accompany PDL and raster bitmap data. The job buffer circuit 52 provides the digital print stream 18 to the page normalization process 58. The user interface device 54 permits the system operator to control certain aspects of the print job and provides operator instructions 32 to the operator instruction interpretation process 56 based on control selections by the operator. The operator instruction interpretation process 56 provides operator instruction data to the page normalization process 58.

The page normalization process 58 collects and makes local to the print controller all digital image data, job and page instructions, and operator instruction data. The page normalization process 58 also organizes the print job into pages and creates a normalized page print stream 34. The page normalization process 58 provides its output to the conversion process 63. The conversion process 63 simplifies the normalized page print stream 34, sequences it, and routes it to the dual rendering process 64. The dual rendering process 64 renders each print object in the converted print stream 80 to a visually-equivalent bitmap and control string 40. Print objects may be processed either in batch or sequentially with the equivalent result that a complete bitmap is built and a complete control string is accumulated for each page. Each bitmap page 38 is carried along in the sequence it is rendered, forming a stream of bitmap pages 38, and provided to the bitmap page buffer circuit 68 via an internal image channel 84. Each control string 40 is carried along in the sequence it is rendered, forming a stream of unique control strings 40, each unique control string 40 corresponding to a specific bitmap page 38, and provided to the control string buffer circuit 70 via an internal control channel 86.

Continuing to refer to FIG. 3, the processor 62 performs overall process control of the digital print system 10. More specifically, the processor 62 sends timing and control signals to the conversion process 63, dual rendering process 64, and caching and synchronization process 66. In regard to page-level synchronization 42, the processor 62 informs the caching and synchronization process 66 of conditions impacting its function, such as the status of print jobs currently being processed throughout the digital print system 10, the status of relevant process stations within the digital print system 10, and the status of the dual rendering process 64, the internal image channel 84, and the internal control channel 86. The caching and synchronization process 66 ensures each bitmap page 38 (and its subsequent analog page 50 representation) is page-level synchronized with its corresponding control string 40 at each process station of the IOT 16 where process correctness is verified. The caching and synchronization process 66 provides control signals 88 to the bitmap page buffer circuit 68 to control the caching of multiple bitmap pages 38 and the transmission of an individual bitmap page 38 over the image channel 20. Similarly, the caching and synchronization process 66 provides control signals 88 to the control string buffer circuit 70 to control the caching of multiple control strings 40 and transmission of an individual control string 40 over the control channel 22.

The bitmap page buffer circuit 68 provides a temporary storage area (i.e., cache) for a plurality of bitmap pages 38 which have been rendered to the internal image channel 84. The bitmap page buffer circuit 68 provides each bitmap page 38 to the IOT 16 over the image channel 20 and retains multiple bitmap pages 38 according to the control signals 88 from the caching and synchronization process 66.

The control string buffer circuit 70 provides a temporary storage area (i.e., cache) for a plurality of control strings 40 rendered to the internal control channel 86. Each control string 40 corresponds to and is indexed with the specific bitmap page 38 with which it was dual rendered. The control string buffer circuit 70 provides each control string 40 to one or more selected process station in the IOT 16 over the control channel 22 and retains multiple control strings 40 according to the control signals 88 from the caching and synchronization process 66.

Still referring to FIG. 3, the process correctness buffer circuit 60 receives a process correctness signal 24 from any process station of the IOT 16 where process correctness and/or page integrity is verified. The process correctness signal 24 provides an indication of whether the bitmap page 38 (and its subsequent analog page 50 representation) in the image channel 20 at the particular process station of the IOT 16 matches its corresponding control string "truth" from the control channel 22. The process correctness signal 24 is associated with a specific bitmap page 38 (and its subsequent analog page 50 representation) and with a particular process station of the IOT 16. The process correctness buffer circuit 60 receives a plurality of process correctness signals 24 if process correctness is verified at multiple process stations and/or if subsequent pages begin proceeding through the sequence of process stations before previous pages have advanced through the last process station. Accordingly, the process correctness buffer circuit 60 provides a temporary storage area for a plurality of process correctness signals 24 until such signals are provided to the processor 62 and/or no longer required to be retained for the processor 62. Where the process correctness signal 24 indicates the image channel 20 matches the control channel 22 and is therefore "correct," the processor 62 continues normal document processing with confidence of the correctness of the document. Where the process correctness signal 24 indicates a mismatch was detected, the processor 62 implements process control measures to correct the problem and continue document processing without discarding previous pages that were processed with confirmed correctness. Purging and re-running the mismatched pages are typically included in such process control measures by the processor 62.

Figure 4A:
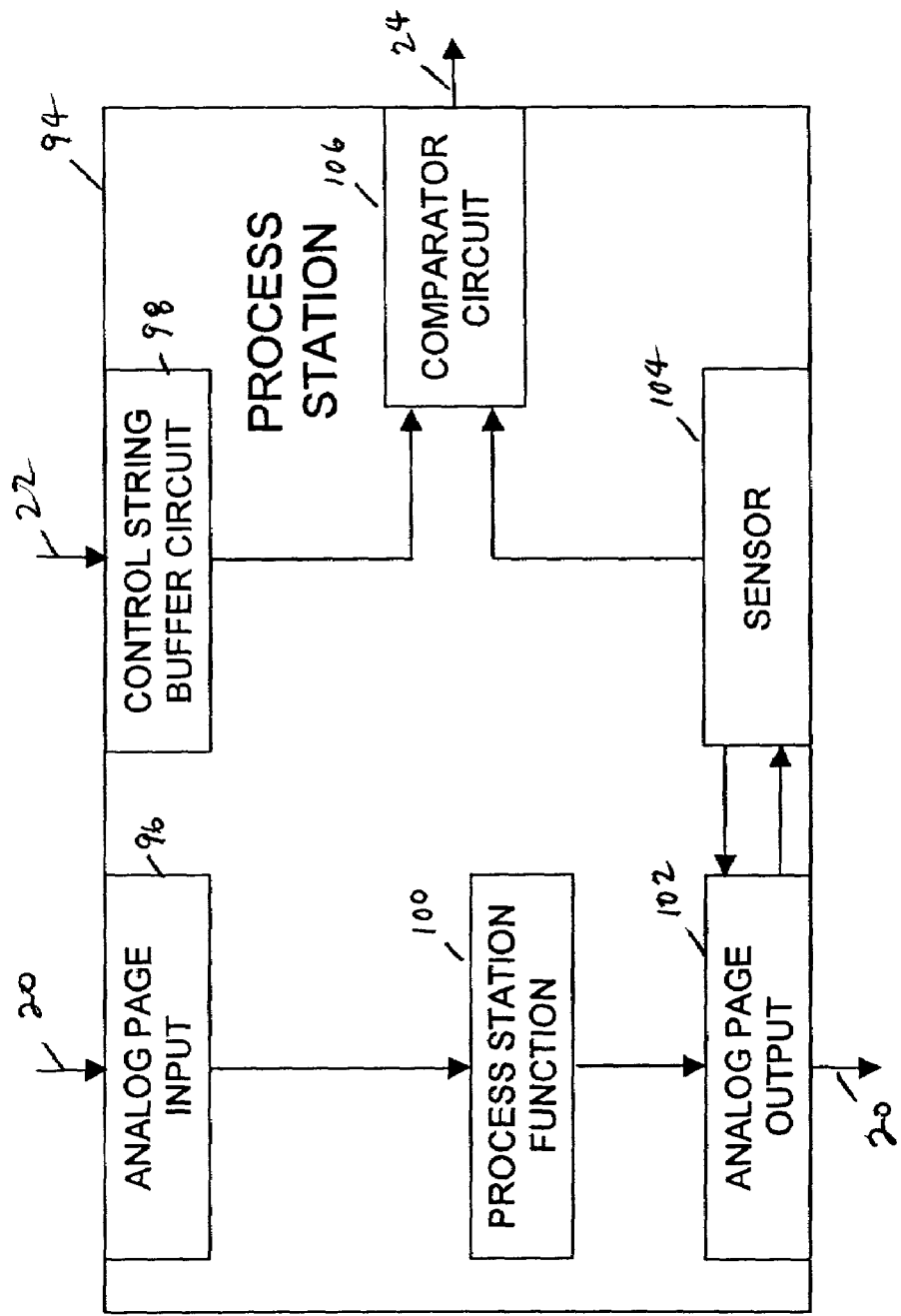
FIGS. 4a through 4e shows five block diagrams depicting several embodiments for a process station within the image output terminal (IOT) of the digital print system of FIG. 1.
Figure 4B:
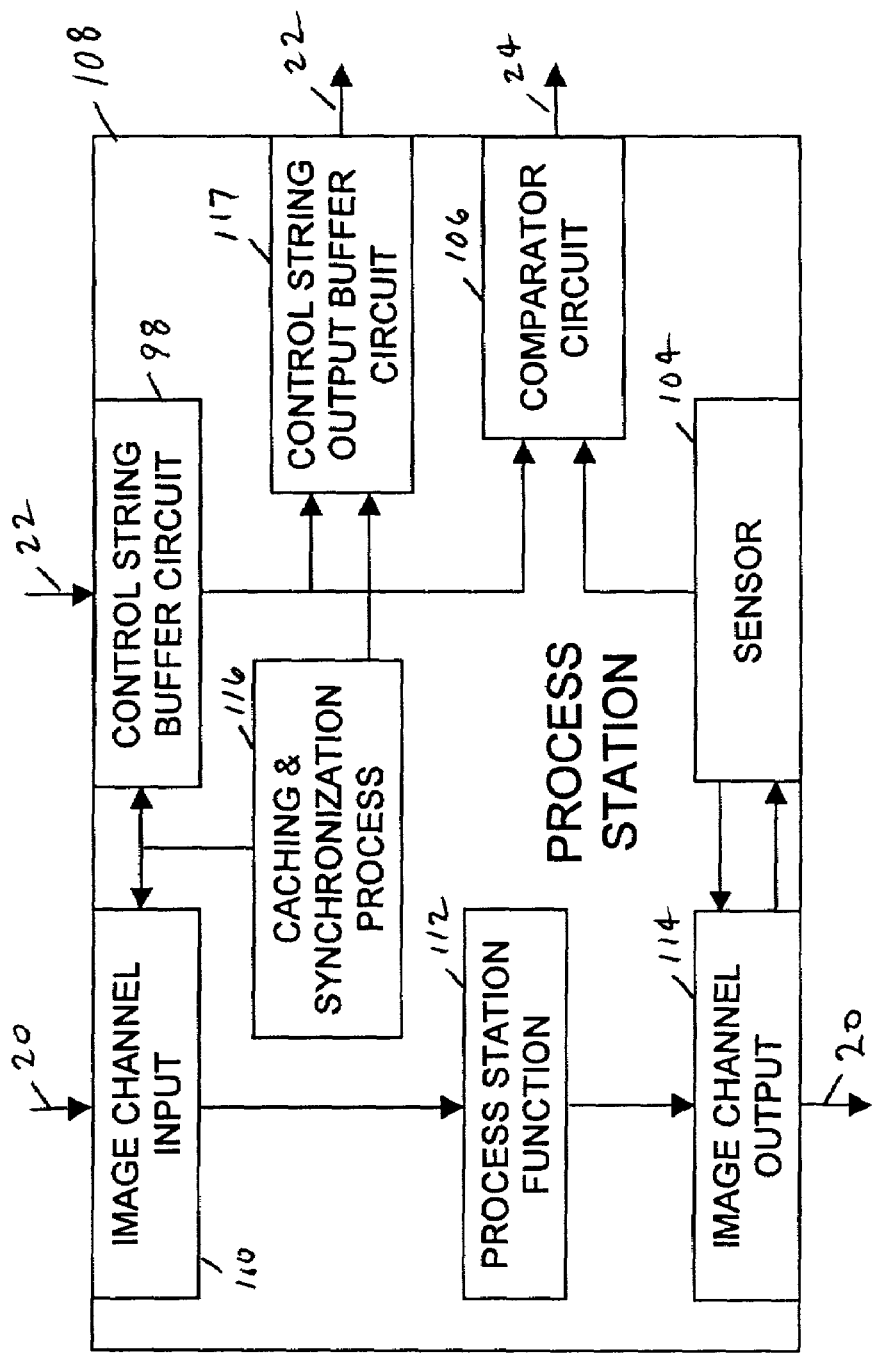
Figure 4C:
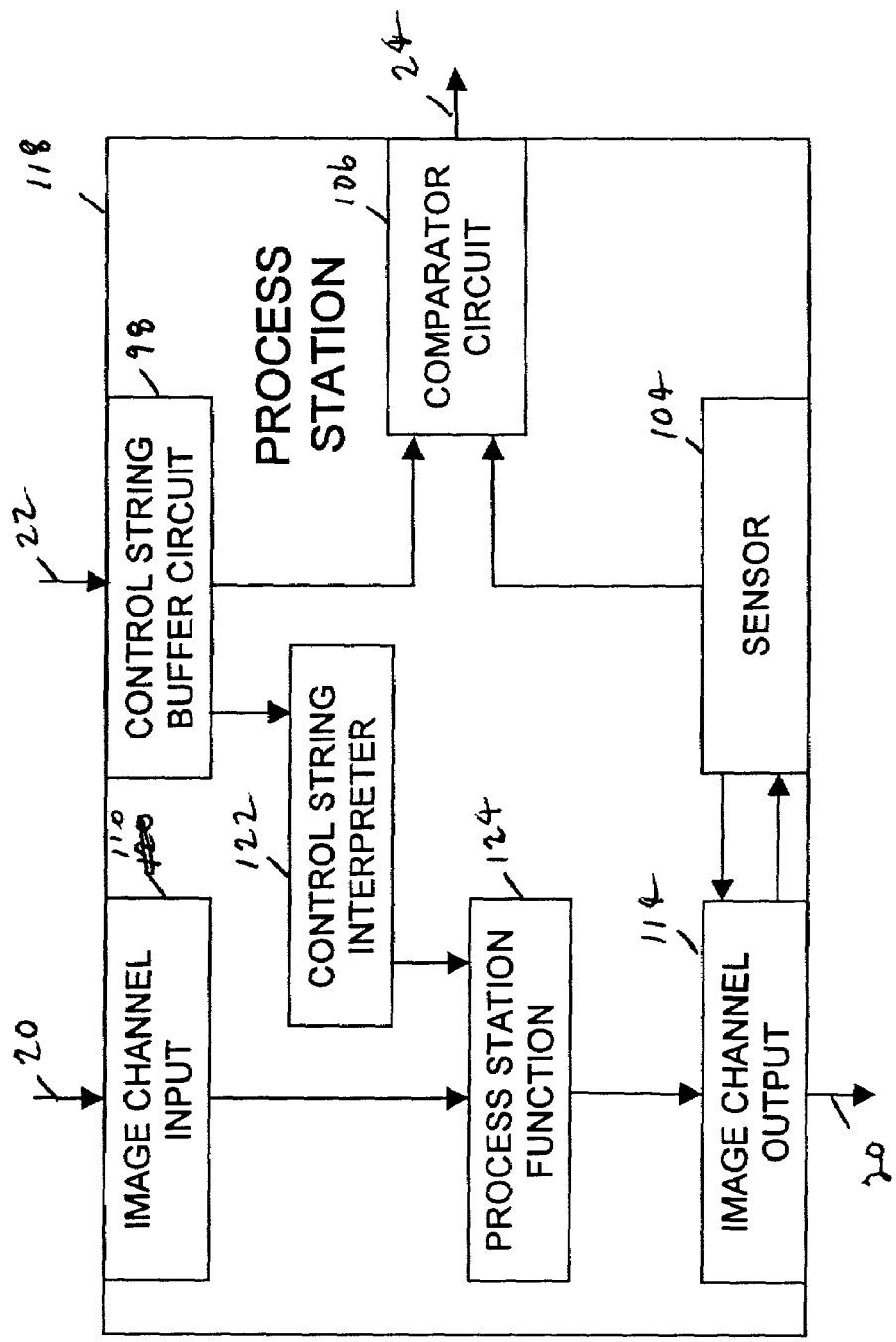
Figure 4D:
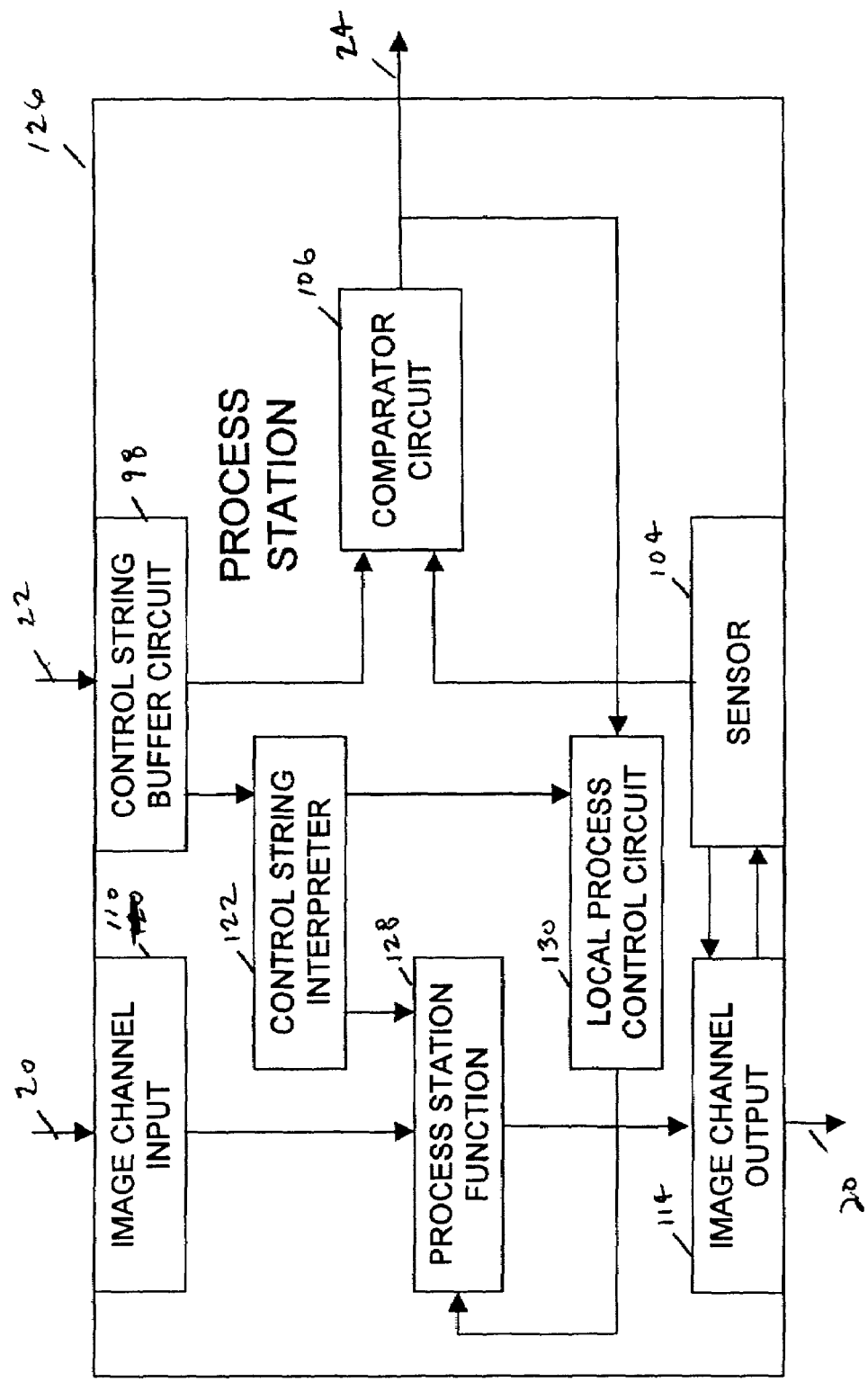
Figure 4E:
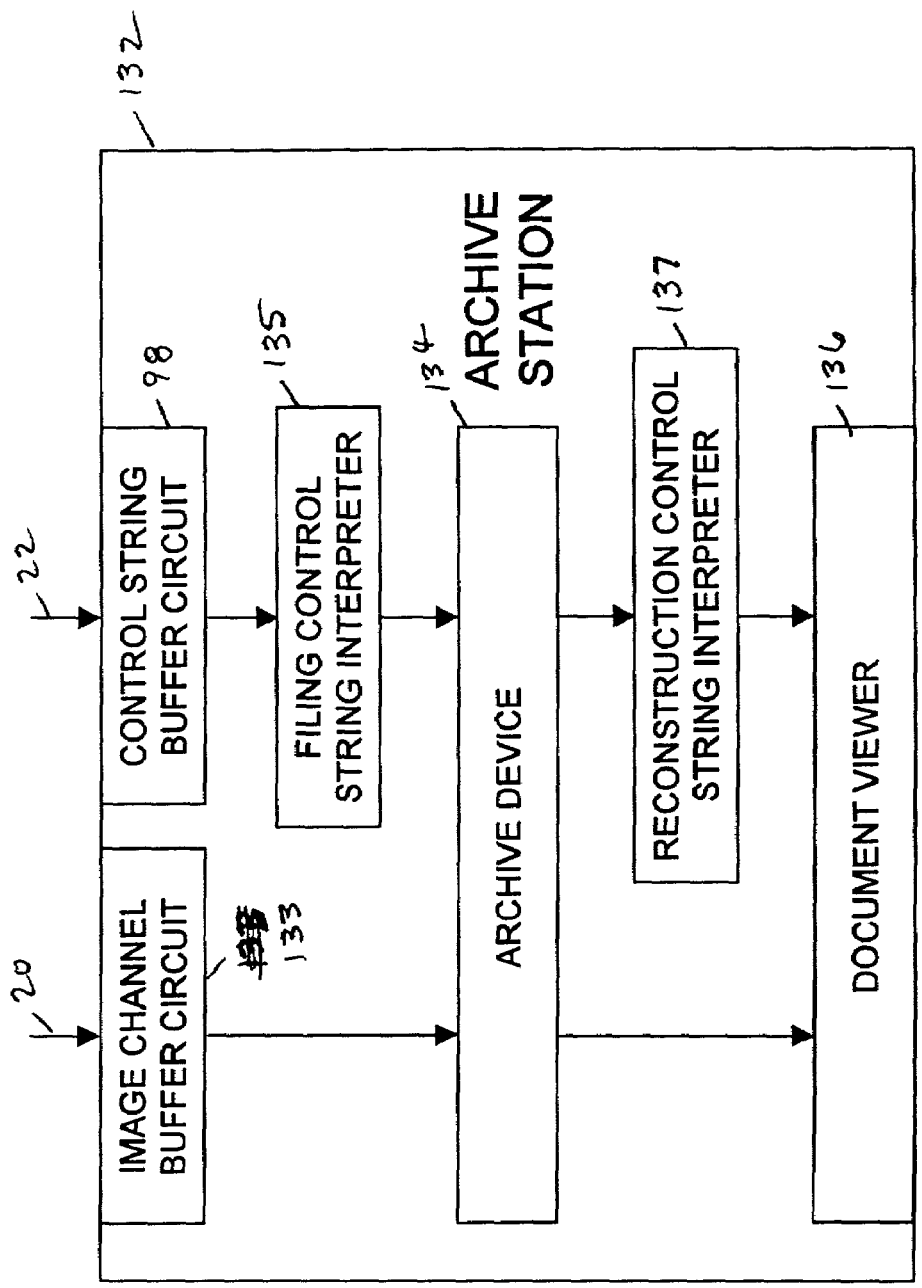

Referring to FIGS. 4a through 4e, where like numerals designate like components, a block diagram of five potential embodiments for process stations within the IOT 16 of FIG. 1 are shown. The first four block diagrams, FIGS. 4a through 4d, depict embodiments for generic process stations (94, 108, 118, 126) that may be implemented in one or more process stations within the IOT 16, including feeding stations 44, imaging stations within the print engine 46, and finishing stations 48. The last block diagram, FIG. 4e, depicts an embodiment for a more specific type of process station referred to as an archive station 132. The archive station 132 and the generic process stations (94, 108, 118, 126), are described in more detail below.

While process stations of the present invention are described in connection with the various embodiments shown in FIGS. 4a through 4e, it is not intended to limit the present invention to these embodiments. On the contrary, it is intended for the present invention to apply to all alternatives, modifications, and equivalents as may be included within the spirit and scope of this description and the appended claims. The present invention is indeed applicable to any process station embodiment that permits the addition of a dual rendered, page-level synchronized control channel for verification of process correctness including verification of image, page, and/or document integrity.

Referring to FIG. 4a, a block diagram of a process station 94 incorporating features of the present invention is provided. The process station 94 is comprised of an analog page input 96, a control string buffer circuit 98, a process station function 100, an analog page output 102, a sensor 104, and a comparator circuit 106. The process station 94 receives a stream of analog pages 50 from a previous process station at the analog page input 96 via the image channel 20. Each analog page 50 is sequentially processed by the process station 94. Note the image channel 20 is shown carrying the analog page 50, rather than the bitmap page 38. This indicates that the bitmap page 38 has been translated to its equivalent analog page 50 by a previous process station. Therefore, the embodiment being described is limited to process stations after the process station that translates the bitmap page 38 to its equivalent analog page 50. Accordingly, the embodiment being described may be implemented at the output of the print engine 46 or at any finishing station 48.

The analog page 50 is routed from the analog page input 96 to the process station function 100, where the process station 94 performs its function on the analog page 50 and passes it along to the analog page output 102. Examples of process station functions include "fusing" the transferred toner image on a page of stock, "sorting" printed pages, or "stapling" documents. As the analog page 50 travels through the analog page output 102, it passes by the sensor 104. The sensor 104 detects certain characteristics of the analog page 50 that were expected to be created or altered by the process station function 100. The sensor 104 produces a measurement related to such characteristics and provides the measurement to the comparator circuit 106.

Continuing to refer to FIG. 4a, the process station 94 receives control strings 40 via the control channel 22 from the print controller 14 at the control string buffer circuit 98. The control string buffer circuit 98 provides a temporary storage area (i.e., cache) for a plurality of control strings 40, including the dual-rendered, page-level synchronized control string 40 corresponding to the analog page 50 passing through the process station 94 and the control strings 40 for one or more previous and one or more subsequent analog pages 50. The control string 40 corresponding to the analog page 50 passing by the sensor 104 is provided to the comparator circuit 106. The control strings 40 for previous or subsequent analog pages 50 may optionally be available to the comparator circuit 106. The comparator circuit 106 compares the "measured" analog page 50 to the "truth" or "reference" from the control string 40 to verify the correctness of the analog page 50 passing through the process station 94. In certain instances, the comparator circuit may also compare the "measured" analog page 50 to the "truth" or "reference" from the control strings 40 for previous and/or subsequent analog pages 50 to ensure proper matching, proper sequencing, or other parameters related across pages. The comparator circuit 106 provides the result of the comparison to the print controller 14 via the process correctness signal 24. The process correctness signal 24 may also be provided to other process stations and other components of the digital print system 10. The process correctness signal 24 provides an indication of whether the analog page 50 advancing to the next process station via the image channel 20 is "correct" or, alternatively, whether there is a "mismatch," according to the control strings 40 in the control channel 22.

Referring to FIG. 4b, a block diagram of a process station 108 incorporating features of the present invention is provided. The process station 108 is comprised of an image channel input 110, the control string buffer circuit 98, a process station function 112, an image channel output 114, the sensor 104, a caching and synchronization process 116, a control string output buffer circuit 117, and the comparator circuit 106. The process station 108 operates similar to the process station 94 of FIG. 4a. However, one distinction is that the analog page input 96 and analog page output 102 are respectively referred to as the image channel input 110 and image channel output 114 in the embodiment being described. This indicates that the image channel 20 may carry either bitmap pages 38 or analog pages 50. Therefore, the embodiment being described may be implemented in any feeding station 44, imaging station within the print engine 46, or finishing station 48.

In the embodiment being described, if the bitmap page 38 is provided to the image channel input 110 and routed to the process station function 112, the process station 108 performs its function on the bitmap page 38 and passes it along to the image channel output 114. At the image channel output 114, certain characteristics of the page are detected by the sensor 104 and a measurement is provided to the comparator circuit 106 in the same manner as described for process station 94 of FIG. 4a.

Continuing to refer to FIG. 4b, when the process station 94 receives the bitmap page 38, the process station 108 receives control strings via the control channel 22 in the same manner as described for process station 94 of FIG. 4a. However, when the process station 108 receives bitmap pages 38, rather than analog pages 50, the caching and synchronization process 116 ensures each control string 40 is properly correlated to its corresponding bitmap page 38 within the process station 108. While local caching and synchronization may not be required in all implementations of the embodiment being described, if a particular implementation permits a plurality of bitmap pages 38 to be retained in the image channel input 110, local caching and synchronization between bitmap pages 38 and control strings 40 becomes more important. Accordingly, the caching and synchronization process 116 introduces an additional level of control for providing control strings 40 from the control string buffer circuit 98 to the comparator circuit 106. Otherwise, the comparator circuit 106 operates in the same manner as described for process station 94 of FIG. 4a. When the process station 108 receives analog pages 50, local caching and synchronization may also be provided by the caching and synchronization process 116 as described for bitmap pages 38.

Another feature provided by the caching and synchronization process 116 is a relay mechanism for conveying the control string 40 to one or more subsequent process stations. This provides the overall digital print system 10 with an alternate method of page-level synchronization. In the method previously described, the caching and synchronization process 116 ensures that the control string 40 is transmitted to each of one or more subsequent process stations in a manner that ensures synchronization with its corresponding bitmap page 38 (and its subsequent analog page 50 representation) as the page advances through the IOT 16. In the alternate method being described, the control string buffer circuit 98 provides the control string 40 to the control string output buffer circuit 117. When subsequently signalled by the caching and synchronization process 116, the control string 40 is relayed to one or more subsequent process stations within the IOT.

Referring to FIG. 4c, a block diagram of a process station 118 incorporating features of the present invention is provided. The process station 118 is comprised of the image channel input 110, the control string buffer circuit 98, a control string interpreter 122, a process station function 124, the image channel output 114, the sensor 104, and the comparator circuit 106. The process station 118 operates similar to the process station 94 of FIG. 4a. Like process station 108 of FIG. 4b, the embodiment being described may be implemented in any feeding station 44, imaging station within the print engine 46, or finishing station 48.

In the embodiment being described, the page carried by the image channel 20 is routed through the process station function 124 in the same manner as described for process station 94 of FIG. 4a. Likewise, the sensor 104, control string buffer circuit 98, and comparator circuit 106 operate in the same manner as described for process station 94 of FIG. 4a. However, in addition to providing the control string to the comparator circuit 106, the control string buffer circuit 98 provides the dual-rendered, page-level synchronized control string 40 for the page passing through the process station 118 to the control string interpreter 122. The control string interpreter 122 interprets process control commands embedded in the control string 40 that are directed at the process station 118 and provides control signals to the process station function 124. The process station function 124 performs its function according to the control commands interpreted and provided to it by the control string interpreter 122.

The control string interpreter 122 in the embodiment being described also permits the control channel 22 to be used to carry setup instructions, tuning instructions, and other control instructions to the process station 118. This secondary function permits the control channel 22 to reduce or replace traditional control signals between the print controller 14 and the process station 118. When the control channel 22 is used in this manner it becomes an integral part of the closed-loop process control measures available to the print controller 14 for control of the process station 118. For example, the control channel 22 can be used to command a feeding station 44 to advance a sheet of paper to the print engine 46. Further examples include using the control channel 22 to establish correct operating conditions for the print engine 46 to tune or adjust imaging stations to achieve a desired marking concentration or color registration or to provide custom page-specific setup instructions to imaging stations in order to print a particular page at certain xerographic set points in lieu of default set points. Still another example includes using the control channel 22 to command a finishing station 48 to act upon a particular printed page or a printed document.

Referring to FIG. 4d, a block diagram of a process station 126 incorporating features of the present invention is provided. The process station 126 is comprised of the image channel input 110, the control string buffer circuit 98, the control string interpreter 122, a process station function 128, the image channel output 114, the sensor 104, the comparator circuit 106, and a local process control circuit 130. The process station 126 operates similar to the process station 94 of FIG. 4a and process station 118 of FIG. 4c. In the embodiment being described, the page carried by the image channel 20 is routed through the process station function 128 in the same manner as described for process station 94 of FIG. 4a. Likewise, the sensor 104, control string buffer circuit 98, and comparator circuit 106 operate in the same manner as described for process station 94 of FIG. 4a. Further, the control string interpreter 122 operates in the same manner as described for process station 118 of FIG. 4c.

The important distinction for the embodiment being described is the addition of a local process control circuit 130 in the process station 126. The local process control circuit 130 provides the process station 126 with local closed-loop process control over the process station function 128. The comparator circuit 106 provides the process correctness signal 24 to the local process control circuit 130. This interface between the comparator circuit 106 and the local process control circuit 130 permits local verification of process correctness to be an integral part of local process control measures. For example, the local process control circuit 130 may use the process correctness signal 24 to confirm local process control measures were effective or to determine that continued local process control measures are necessary.

Still referring to FIG. 4d, the control string interpreter 122 provides process control commands to the local process control circuit 130. This interface between the control string interpreter 122 and the local process control circuit 130 establishes a hierarchy of process control between the print controller 14 and the process station 126. The print controller 14 having supervisory control and the process station 126 having local control. Accordingly, the print controller 14 can coordinate control of the process station 126 with other process stations in the IOT 16 and the local process control circuit 130 can reduce the processing load on the print controller 14 and improve the response time to complete corrective process control measures.

Referring to FIG. 4e, a block diagram of a more specific type of process station, referred to as an archive station 132, is provided. The archive station 132 may be within the IOT 16 or, alternatively, may be connected to the digital print system 10 as an external peripheral device. The archive station 132 is quite different than other process stations within the IOT 16 because its purpose is to provide continued support for processed documents after they are distributed and is not a necessary process step in regard to the actual processing of documents. The archive station 132 is comprised of the image channel buffer circuit 133, the control string buffer circuit 98, a filing control string interpreter 135, an archive device 134, a reconstruction control string interpreter 137, and a document viewer 136.

The image channel buffer circuit 133 receives bitmap pages 38 via the image channel 20 and provides the bitmap pages 38 to the archive device 134. Likewise, the control string buffer circuit 98 receives the dual-rendered, page-level synchronized control strings 40 via the control channel 22 and provides them to the filing control string interpreter 135. The filing control string interpreter 135 permits the archive station 132 to extract keywords and other document descriptors from the control string and use them in retrieval indexes to the archive file. The archive device 134 can be any electronic storage device, including, inter alia, a hard disk drive or a writeable compact disc drive. Bitmap pages 38 and control strings 40 are stored on the archive device in a manner that associates all the bitmap pages 38 and all the control strings 40 for a processed document together and retains the sequence of bitmap pages 38 and the one-to-one relationship of control strings 40 to bitmap pages 38 for future retrieval of the archived document. The processed document may also be stored in a manner that associates keywords and other document descriptors from the control strings 40 with corresponding data fields, data elements, or other print objects within the bitmap pages 38 of the document. When retrieval of the document is desired, the archive device 134 provides the stored bitmap pages 38 to the document viewer 136 and the stored control strings 40 for the document to the reconstruction control string interpreter 137. The reconstruction control string interpreter 137 converts each control string 40 to commands that are related to page reconstruction on the document viewer 136. The reconstruction control string interpreter 137 also permits the archive station 132 to generate data fields, data elements, or other print objects associated with encoded keywords or other document descriptors in the control string 40 on the document viewer 136. The document viewer 136 enables an operator to view reconstructed documents and generated print objects. The document viewer 136 may also permit the operator to print documents and print objects.

Figure 5:
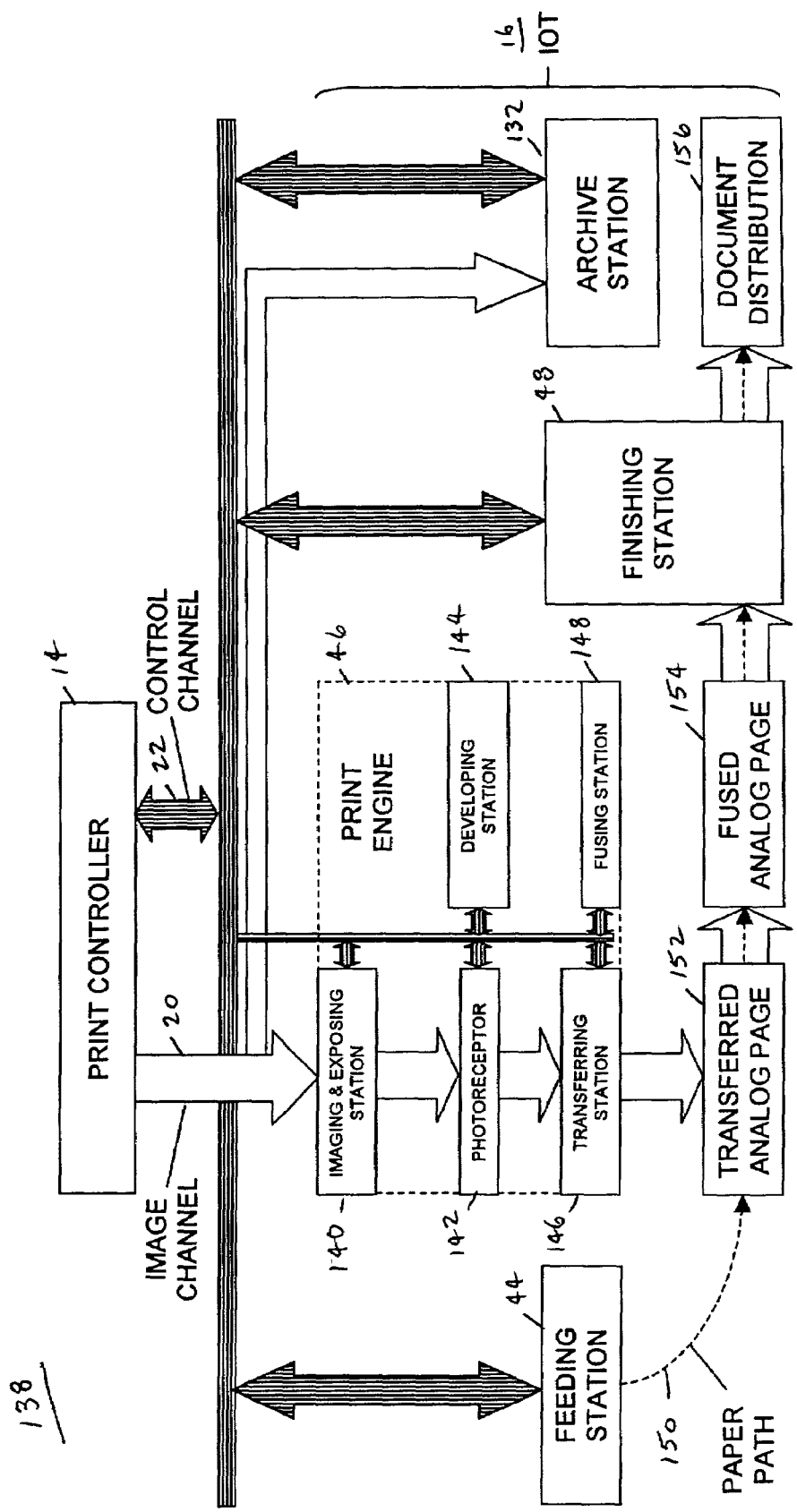
FIG. 5 shows a schematic diagram of a monochrome electrophotographic digital print system incorporating features of the present invention.

Referring to FIG. 5, a schematic diagram of a monochrome electrophotographic digital print system 138 that incorporates features of the present invention is shown. Monochrome electrophotographic digital print systems process documents using a single color toner marking material, usually black. The electrophotographic printing process is well known in the art. While the present invention is described in connection with the monochrome electrophotographic digital print system 138, it is not intended to limit the present invention to that embodiment. On the contrary, it is intended for the present invention to apply to all alternatives, modifications, and equivalents as may be included within the spirit and scope of this description and the appended claims. The present invention is indeed applicable to any type of electrophotographic digital print system, including color systems. In addition to electrophotographic systems, the present invention is also applicable to digital print systems that use ink and other types of marking materials.

The electrophotographic digital print system 138 is comprised of the print controller 14 and the IOT 16. These major components operate and communicate in the same manner described for the digital print system 10 of FIG. 1. Accordingly, the print controller 14 provides the dual-rendered, page-level synchronized image channel 20 and control channel 22 to a plurality of stations within the IOT 16. The IOT is comprised of the feeding station 44, the print engine 46, the finishing station 48, and the archive station 132. The print engine 46 is comprised of an imaging and exposing station 140, a photoreceptor 142, a developing station 144, a transferring station 146, and a fusing station 148. The stations within the print engine 46 are also commonly referred to, individually or as a group, as imaging stations. Alternative configurations of digital print systems may include multiple feeding stations and/or multiple finishing stations, as disclosed in U.S. Pat. No. 5,629,775 and incorporated herein by reference. Alternative configurations may also include multiple imaging stations for each color separation of a color printer, as disclosed in U.S. Pat. No. 5,950,040 and incorporated herein by reference.

The diagram (FIG. 5) depicts the flow of a page image as it advances along the image channel 20 through various stations of the IOT 16. As discussed, the image channel begins at the print controller 14 and the page image is initially a bitmap page 38. The bitmap page 38 is provided to the imaging and exposing station 140. The imaging and exposing station 140 converts the bitmap page 38 to an analog page 50 by creating a latent image on the photoreceptor 142. As the photoreceptor 142 passes by the developing station 144, toner particles are attracted to the latent image, creating a toner image on the photoreceptor 142. As the photoreceptor 142 continues to advance the analog page, in the form of the toner image, to the transferring station 146, the feeding station 44 advances a page of stock along the paper path 150 to the transferring station 146. Just prior to reaching the transfer point in the transferring station 146, the page of stock is electrostatically charged. As the advancing photoreceptor 142 and page of stock converge at the transfer point in the transferring station 146, the toner image is attracted to the charged page and the transferred toner image creates a transferred analog page 152.

Continuing to refer to FIG. 5, the transferred analog page 152 continues along the joint paper path 150 and image channel 20 to the fusing station 148. At the fusing station 148, the transferred toner image is permanently fixed to the page of stock, creating a fused analog page 154. The fused analog page 154 continues to the finishing station 48 where it is directed by a sorter to a collection point established to collect all pages of the document being processed. Once all pages of the document are collected, the finishing station 48 staples the document and it is ready for distribution. Alternatively, or in various combinations, finishing stations could perform a number of different operations, including folding the document, cutting or trimming the document, binding the document, or inserting the document into an envelope. Document processing by the digital print system 138 is completed at the finishing station 48 when finishing operations are completed. After finishing operations are completed, the document is ready to be distributed according to a desired document distribution 156 and the set of bitmap pages 38 making up the document, and all control strings associated with such bitmap pages, are provided to the archive station 132 by the print controller 14.

The drawing also shows the control channel 22 interfacing between the print controller 14 and each process station of the IOT 16. As discussed in reference to FIGS. 4a through 4e, there are a number of embodiments for process stations within the IOT 16 that incorporate features of the present invention. As shown, the control channel 22 is depicted as a control bus that is commonly routed to each process station. Alternatively, the print controller 14 could provide multiple control channels to various combinations of process stations in the IOT 16. Under such alternatives, the print controller 14 could connect the multiple control channels 22 internally to form a common bus or maintain isolation of the multiple control channels 22 to create multiple control buses. One practical alternative might be to create four control channels 22 with a first control channel for feeding stations 44, a second control channel for the imaging stations of the print engine 46, a third control channel for finishing stations 48, and a fourth control channel for the archive device 132. An additional consideration is that any given process station may not incorporate aspects of the present invention, e.g., verification of process correctness, including verification of image, page, and/or document integrity, without affecting the ability of any or all remaining process stations to implement features of the present invention. In the most limited implementation of the present invention, an alternative digital print system may implement the present invention in only one process station, such as at the fusing station 148 which is at the output of the print engine 46. Under such an alternative, the fusing station 148 could verify the image integrity of each fused analog page 154 before it is advanced to the finishing station and potentially bound with other pages of the document being processed. Conversely, in a more comprehensive implementation of the present invention, the process correctness, including image, page, and/or document integrity is verified at each process station, as shown in FIG. 5.

In another alternative, one or more process station may incorporate features of the process station 108 of FIG. 4b enabling it to relay control strings 40 in a synchronized manner along the control channel 22 to subsequent process stations. Under a more comprehensive implementation of this alternative, the print controller 14 initially transmits the control string 40 to the feeding station 44. Once the feeding station 44 confirms process correctness, it relays the control string 40 to the transferring station 146. Likewise, the transferring station 146 confirms process correctness and relays the control string 40 to the fusing station 148. Once process correctness is confirmed at the fusing station 148, the control string 40 is relayed to the finishing station 48. After the finishing station 48 confirms process correctness, it relays the control string to the archive station 132. As described, each relay occurs in a page-level synchronized manner to the sequential advancement of the analog page through the various process stations. Various combinations for sequentially relaying the control string are contemplated because any process station can be added to or removed from the relay chain, either by design or operational control.

The system architecture described above with its technique of dual rendering image information to the image channel 20 and control channel 22 and its combined technique for page-level synchronization of the image information in the two parallel channels provides the digital print system 10 of the present invention with special capabilities. These special capabilities are derived from the inherent ability of the present invention to automatically verify process correctness within any one or any combination of process stations within the digital print system 10. As detailed below, six scenarios implementing these special capabilities of the system architecture of the present invention are contemplated: 1) verification of analog page integrity (FIG. 6), 2) print engine setup procedures (FIG. 8), 3) archive support (FIG. 9), 4) verification of feeding station process correctness (FIG. 10), 5) verification of finishing station process correctness (FIG. 11), and 6) sheet-specific setup commands (FIG. 12). While the special capabilities of the present invention are described in connection with these six scenarios, it is not intended to limit the present invention to these scenarios. On the contrary, it is intended for the present invention to apply to all alternatives, modifications, and equivalents as may be included within the spirit and scope of this description and the appended claims. For example, the basic steps involved in verification of process correctness (FIG. 7) can be accomplished at virtually any process station within the digital print system 10. Likewise, the steps of passing a command to a process station along the control channel and verifying the process station performed according to the command, as shown in FIGS. 8 and 10 through 12, can be accomplished at virtually any process station within the digital print system 10.

Figure 6:
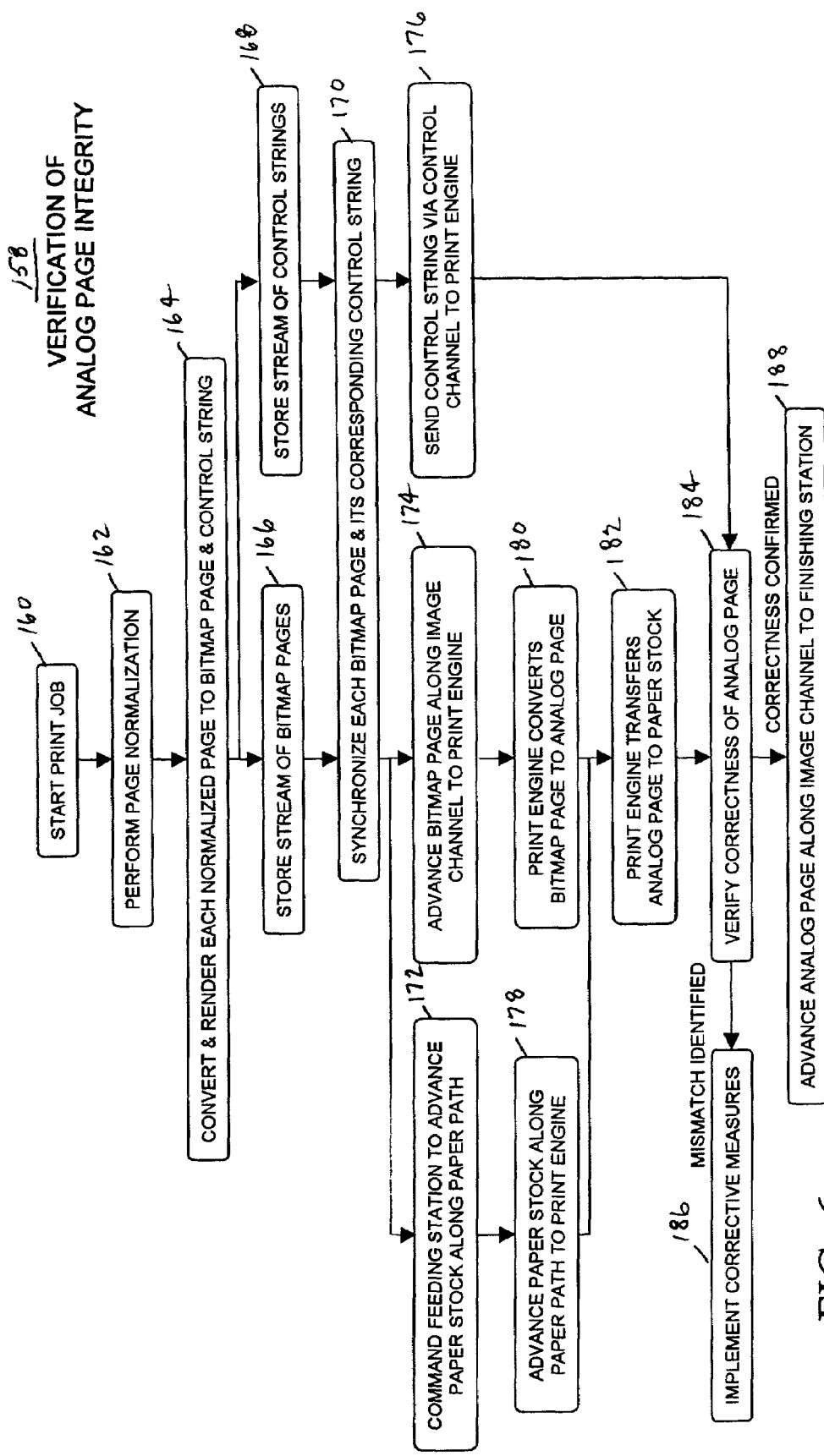
FIG. 6 shows a flow chart illustrating verification of analog page integrity within a digital print system in accordance with the present invention.

Referring to FIG. 6, a flow chart illustrates verification of analog page integrity 158 in accordance with the present invention. The first step is to start the printjob 160. Starting the print job 160 causes a print stream to flow from the input section 12 to the print controller 14. Next, the print controller 14 performs page normalization 162 which includes the collection of all image data, job instructions, page instructions, and verification information necessary to print each normalized page. Next, the print controller 14 converts and renders each normalized page to a bitmap page and a control string 164. In so doing, the print controller 14 processes the verification information in two ways: 1) it renders the verification information as a bar code, a font bitmap, a glyph, or an icon image which is placed in the image channel 20 and 2) it encodes the verification information as a control string 40 which is placed in the control channel 22 as a "truth" source. The dual rendering process 64 results in a stream of bitmap pages 38 and a corresponding stream of control strings 40. The print controller 14 stores the stream of bitmap pages 166 in the bitmap page buffer circuit 68. Likewise, the print controller 14 also stores the stream of control strings 168 in the control string buffer circuit 70. Next, the print controller 14 synchronizes the delivery of each bitmap page and its corresponding control string 170 to the IOT.

As the document is now ready to be processed by the IOT 16, the print controller 14 commands a feeding station to advance paper stock along the paper path 172, advances the bitmap page along the image channel to the print engine 174, and sends the control string via the control channel to the print engine 176, not necessarily in that order. Next, the paper stock is advanced along the paper path to the print engine 178 and the print engine converts the bitmap page to an analog page 180, not necessarily in that order. The print engine 46 advances the analog page 50 along the image channel 20 to the transferring station 146. At the transferring station 146, the paper path 150 merges with the image channel 20 and the print engine transfers the analog page to the paper stock 182. Next, the print engine verifies the correctness of the analog page 184 by sensing certain information to be verified and comparing the measured information to the "truth" from the control string 40. Further details regarding the verification step (184) are provided below in the discussion of the verification of process correctness 190 shown in FIG. 7. Still referring to FIG. 6, if the analog page 50 is not correct, a mismatch is identified and the digital print system 10 implements corrective measures 186, including purging the mismatched page. If the correctness of the analog page 50 is confirmed, the print engine advances the analog page along the image channel to the finishing station 188.

While the verification of analog page integrity 158 scenario suggests very simple control string matching, vastly more complex control string matching is also contemplated. For example, the control string could contain any or all of the following capabilities: 1) (x, y) coordinates for locating the image information to be verified on the analog page, 2) control information from preceding and succeeding pages to ensure the page is in its proper sequence, 3) specifications for multiple fields of image information to be verified on the analog page (e.g., the payee name and dollar amount of a check), or 4) a Java applet or similar program or algorithm for a use-specific verification method of determining correctness.

Figure 7:
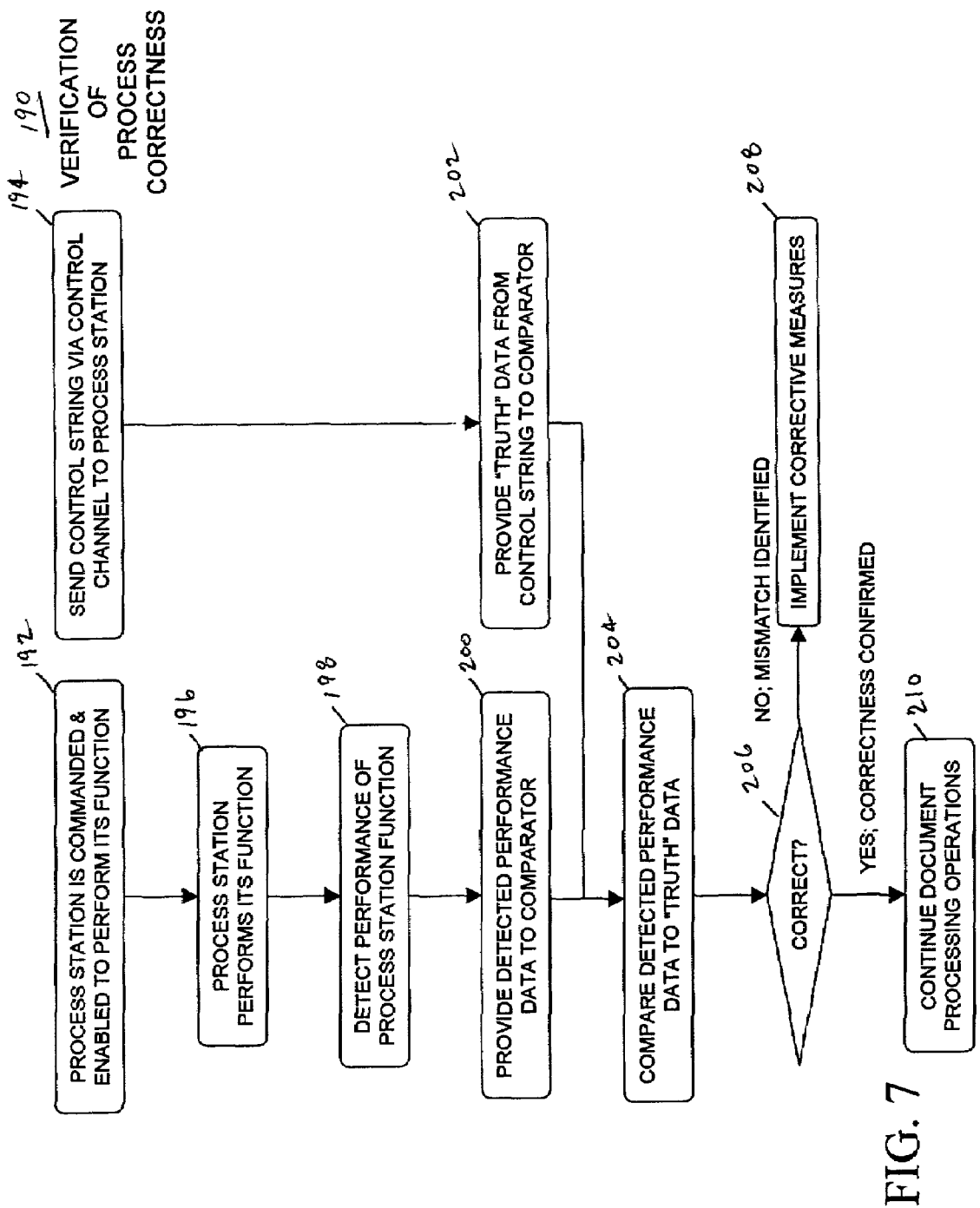
FIG. 7 shows a flow chart illustrating verification of process correctness within a process station of a digital print system in accordance with the present invention.

Referring to FIG. 7, a flow chart shows verification of process correctness 190 within a given process station in accordance with the present invention. This flow chart provides a more detailed view of the verification step (e.g., step 184 of FIG. 6) of the scenarios shown in FIGS. 6 and 8 through 12. Being part of a more comprehensive scenario, verification of process correctness 190 begins presuming two conditions have been satisfied. First, that the process station has been commanded and enabled to perform its function 192 and, second, that the print controller has sent the control string via the control channel to the process station 194. With these conditions satisfied, the process station performs its function 196 and a sensor 104 detects performance of the process station function 198. Next, the sensor 104 provides detected performance data to a comparator 200 and "truth" data from the control string is provided to the comparator 202, not necessarily in that order. The comparator compares the detected performance data to the "truth" data 204 to determine if the process station function was performed correctly 206. If the process station function was not performed correctly, a mismatch is identified and the digital print system 10 implements corrective measures 208. If the process station function was performed correctly, correctness is confirmed and the digital print system 10 continues document processing operations 210.

Figure 8:
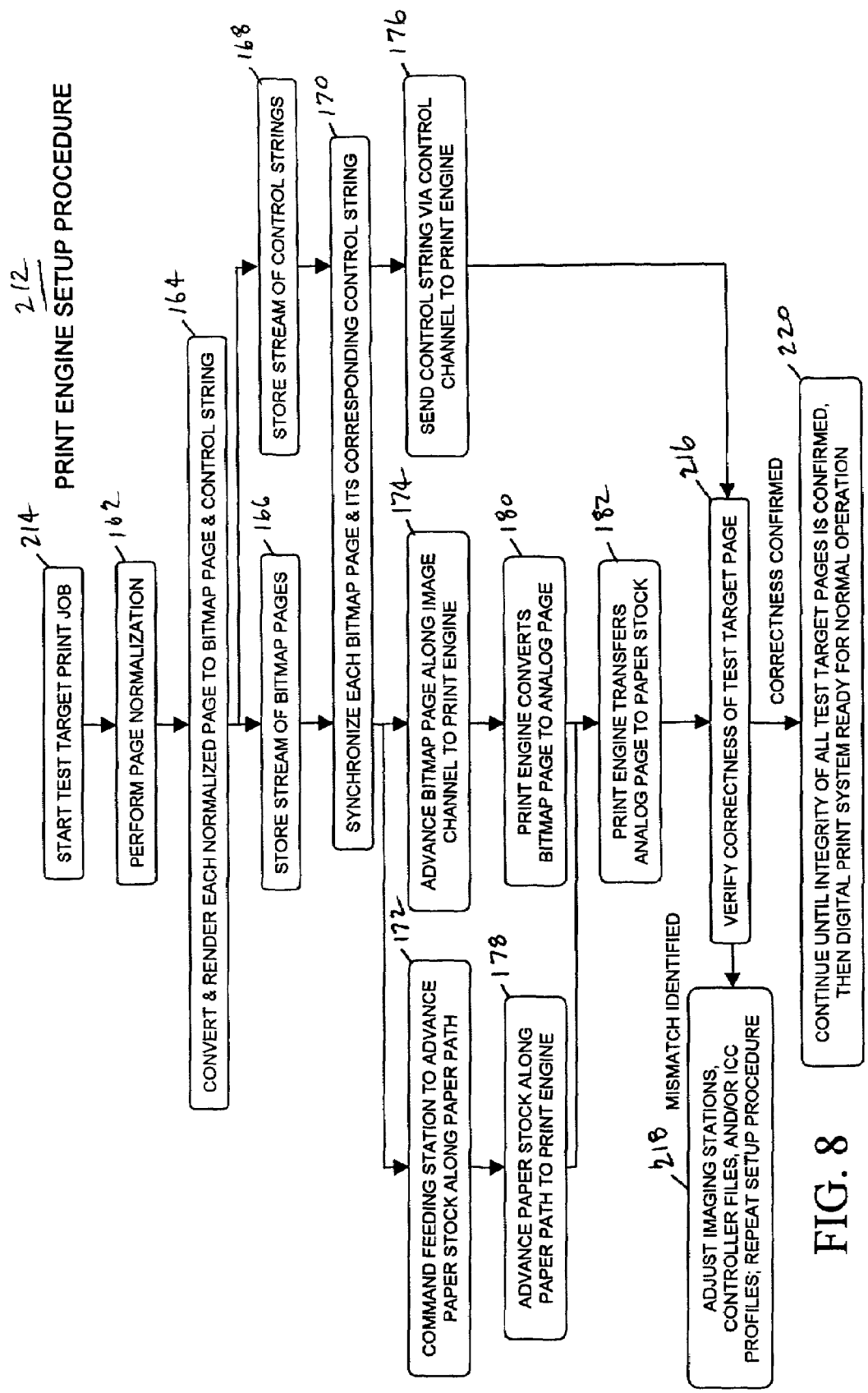
FIG. 8 shows a flow chart illustrating print engine setup procedures within a digital print system in accordance with the present invention.

Referring to FIG. 8, where like numerals designate like components, a flow chart illustrates a print engine setup procedure 212 that incorporates features of the present invention. The first step in the procedure is to start a test target print job 214. Print engine setup procedures 212 are usually performed after installation of the digital print system 10, after a certain period of operation, and after certain maintenance procedures. Since this scenario is based on printing test targets on paper stock, after step 214 this scenario is identical to verifying analog page integrity 158 of FIG. 6 until the verification step (216). At step 216, the print engine 46 verifies the correctness of the test target page by sensing certain information, e.g., toner concentration, color registration, and colorimetric properties, and comparing the measured information to the "truth" from the control string 40. For further details regarding the verification step (216), refer to the discussion above regarding the verification of process correctness 190 of FIG. 7. Still referring to FIG. 8, if the test target page is not correct, a mismatch is identified and the digital print system 10 adjusts its imaging stations, adjusts its print controller files, and/or adjust its ICC profiles and repeats the print engine setup procedure 212. If the correctness of all of the test target pages contained in the setup procedure are confirmed, the digital print system is ready for normal operation 220.

Figure 9:
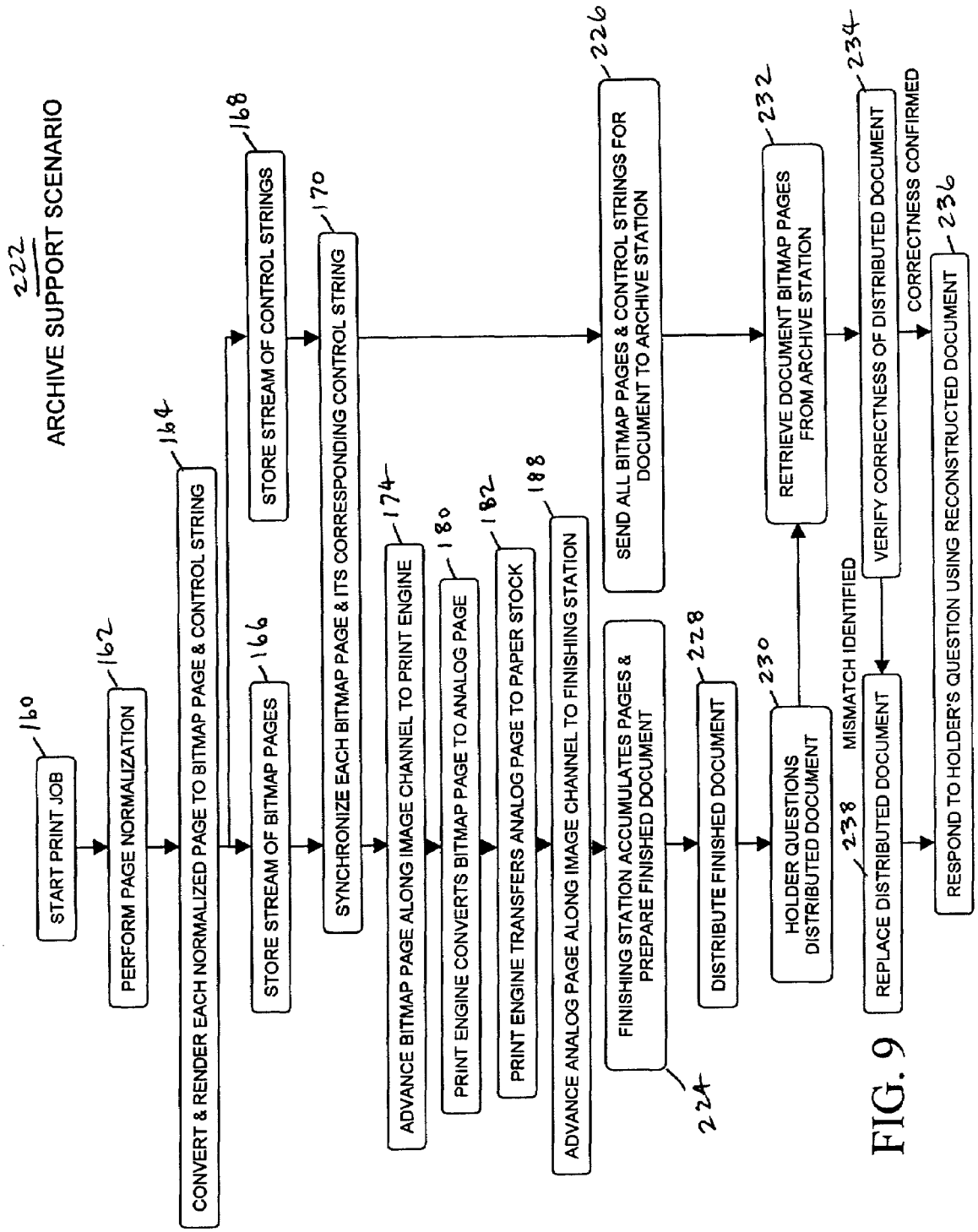
FIG. 9 shows a flow chart illustrating an archive support scenario within a digital print system in accordance with the present invention.

Referring to FIG. 9, where like numerals designate like components, a flow chart illustrates an archive support scenario 222 that incorporates features of the present invention. The features of the archive support scenario 222 that are distinct from the scenario (158) of FIG. 6, referred to as the "substantive steps" of this scenario, begin at steps 224 and 226 after printing operations within the print engine 46 are completed. Accordingly, any scenario that results in the digital print system 10 processing a printjob and printing on paper stock can receive archive support under this scenario. Therefore, the initial steps of the archive support scenario 222 are similar to verifying analog page integrity 158 of FIG. 6. In fact, the entire scenario of FIG. 6 is preferred to have been accomplished prior to the substantive steps of the archive support scenario 222. The first step in the archive support scenario 222, like the scenario of FIG. 6, is to start the print job 160. The archive support scenario 222 continues in a manner similar to the scenario of FIG. 6, including the converting and rendering of normalized pages to bitmap pages and control strings 164 and synchronizing each bitmap page and its corresponding control string 170. The image to be printed advances along the image channel 20 through the print engine 46 and the resulting printed pages advance to the finishing station 48 in the archive support scenario 222 in the same manner as in the scenario of FIG. 6. The substantive steps of the archive support scenario 222 begin after the printed pages reach the finishing station 48.

At this point, the finishing station accumulates the printed pages and prepares the finished document 224. As finishing operations are being performed, all the bitmap pages and corresponding control strings for the document are sent to the archive station 226. Once finishing operations are completed, the finished document is distributed 228 according to its required or desired distribution.

The purpose and benefit provided by the archive support scenario 222 begins when a holder (e.g., recipient, user, or owner) of the distributed document comes to a respondent (e.g., publisher, author, or sponsor of the document or employee or agent for any such parties) with a question, complaint, or comment regarding the document. When the holder questions the distributed document 230, the respondent accesses the digital print system 10 with archive support to retrieve the document bitmap pages from the archive station 232. The retrieved bitmap pages are viewed as the "truth," i.e., the version of the document that was intended to have been distributed. The respondent, typically a customer service representative, uses the retrieved document to communicate with the holder of the distributed document to compare and verify the correctness of the distributed document 234 to the "truth." If the correctness of the distributed document is confirmed, the respondent communicating with the holder of the distributed document responds to the holder's question, comment, or complaint using the retrieved document 236. If the distributed document is not correct, a mismatch is identified and the previously distributed document is replaced 238 with the correct retrieved version of the document. Under the latter situation, once the holder has the correct version of the document, the respondent responds to the holder's question, comment, or complaint with both parties using the retrieved document 236.

Figure 10:
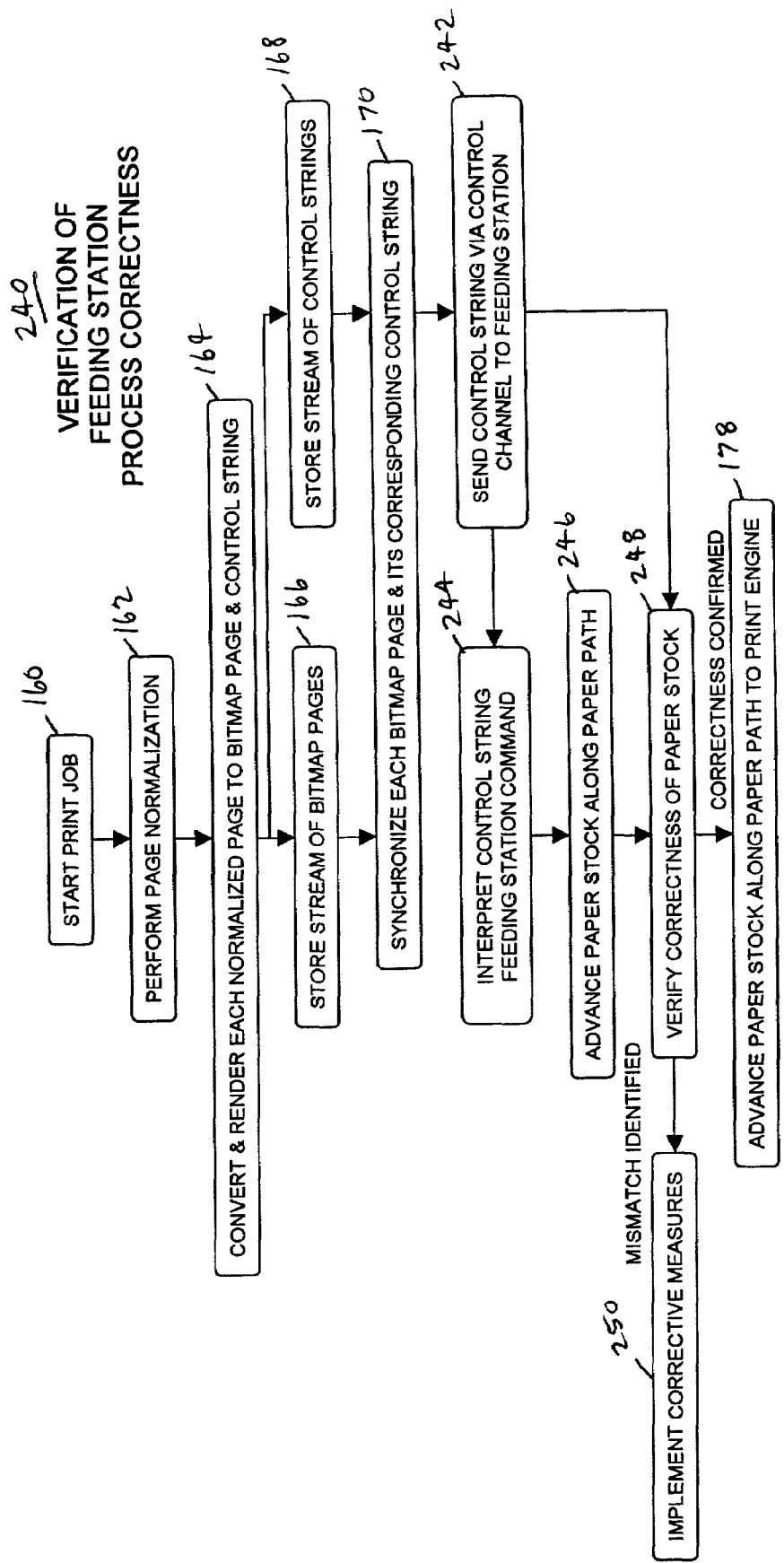
FIG. 10 shows a flow chart illustrating verification of feeding station process correctness within a digital print system in accordance with the present invention.

Referring to FIG. 10, where like numerals designate like components, a flow chart illustrates verification of feeding station process correctness 240 in accordance with the present invention. This scenario begins in the same manner as verifying analog page integrity 158 of FIG. 6 with starting the print job 160. Verifying feeding station process correctness 240 continues in a manner similar to the scenario of FIG. 6 with the converting and rendering of normalized pages to bitmap pages and control strings 164 and synchronizing each bitmap page and its corresponding control string 170. Once the control string 40 corresponding to the next bitmap page 38 to be processed is synchronized, the print controller advances the bitmap page along the image channel to the print engine 174 and sends the control string via the control channel to the feeding station 242, not necessarily in that order. In the scenario being described, the control string 40 contains an embedded command directing the feeding station 44 to perform its function in a certain manner and the feeding station 44 includes the control string interpreter 122 of FIG. 4c which permits it to interpret the command. The control string interpreter 122 interprets the control string feeding station command 244 and, accordingly, the feeding station 44 performs its function. In an alternate embodiment, the print controller 14 may command the feeding station 44 to perform its function via separate control signals, permitting the feeding station 44 to operate whether or not it includes the control string interpreter 122. As a result of either embodiment, the feeding station advances paper stock along the paper path 246. Next, the feeding station verifies the correctness of the paper stock 248 by sensing certain information from the paper stock advancing along the paper path 150 and comparing the measured information to the "truth" from the control string

40. For further details regarding the verification step (248), refer to the discussion above regarding the verification of process correctness 190 of FIG. 7. Still referring to FIG. 10, if the paper stock is not correct, a mismatch is identified and the digital print system 10 implements corrective measures 250, including purging the mismatched paper stock. If the correctness of the paper stock is confirmed, the feeding station advances the paper stock along the paper path to the print engine 178 where subsequent document processing operations continue, as shown in FIG. 6.

Figure 11:
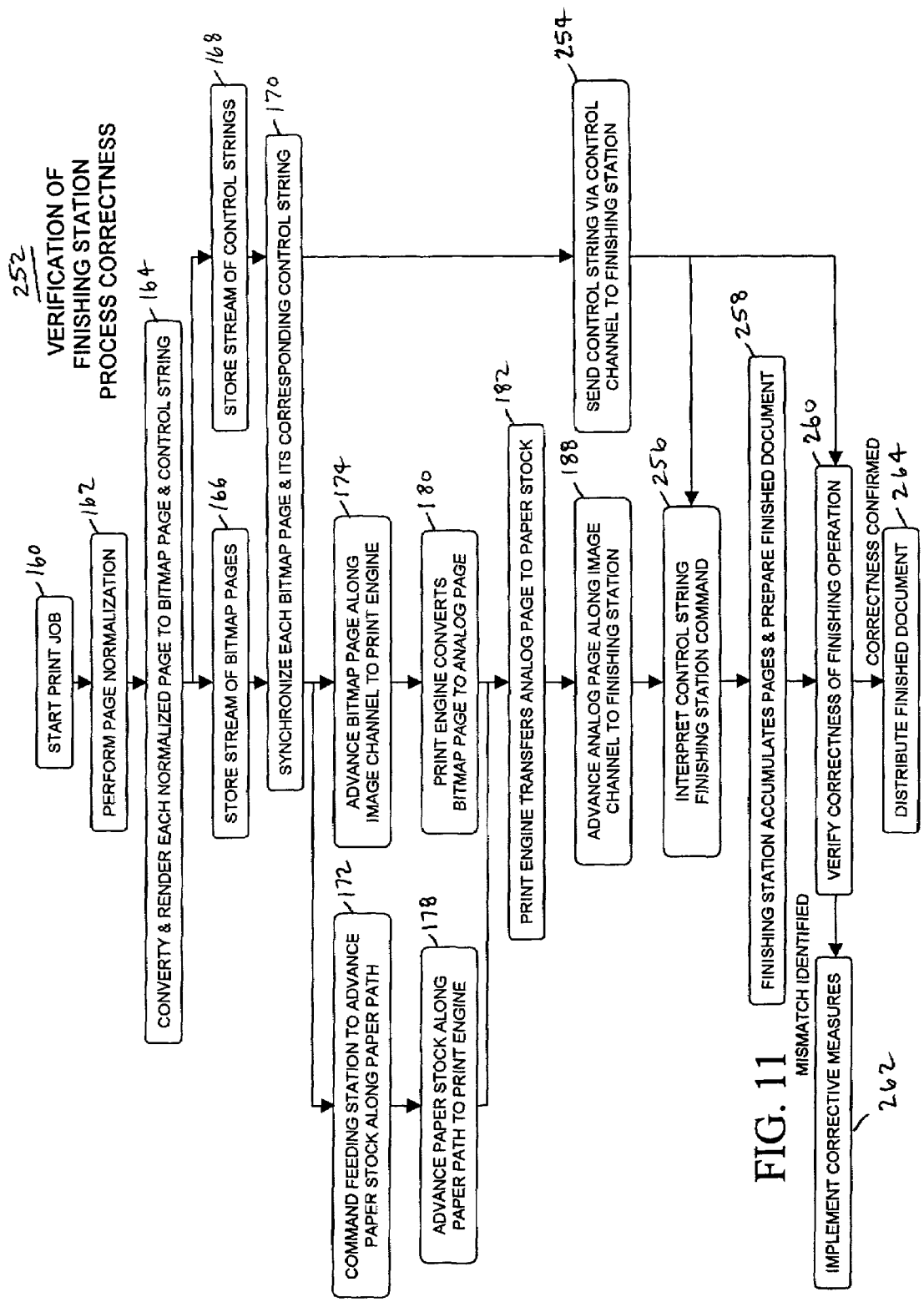
FIG. 11 shows a flow chart illustrating verification of finishing station process correctness within a digital print system in accordance with the present invention.
Figure 12:
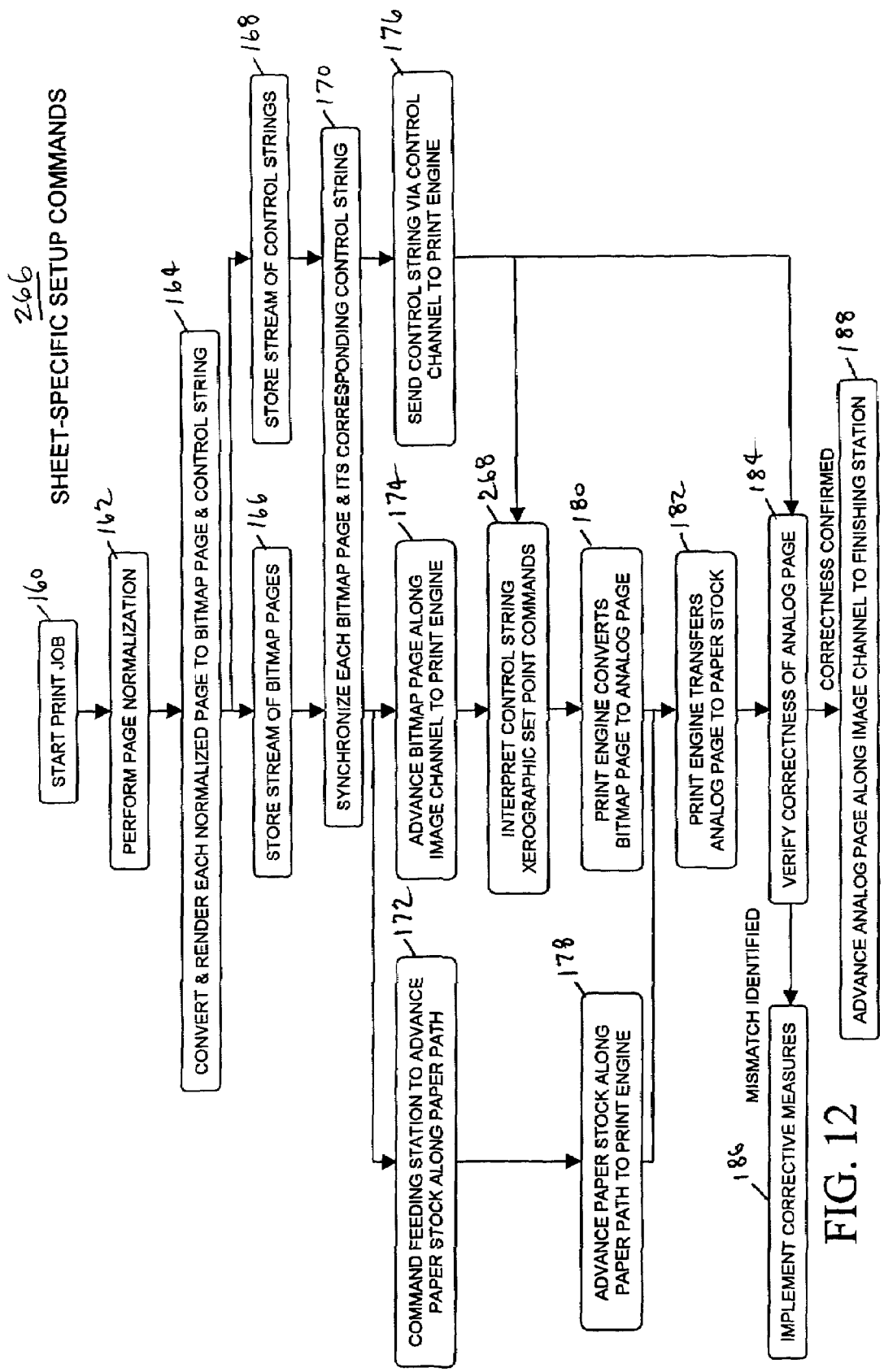
FIG. 12 shows a flow chart illustrating how sheet-specific setup commands are used to control one or more process stations during normal print operations of a digital print system in accordance with the present invention.

Referring to FIG. 11, where like numerals designate like components, a flow chart illustrates verification of finishing station process correctness 252 in accordance with the present invention. The features of verifying finishing station process correctness 252 that are distinct from the scenario (158) of FIG. 6, referred to as the "substantive steps" of this scenario, begin at step 254 after printing operations within the print engine 46 are completed. Therefore, the initial steps of verifying finishing station process correctness 252 are similar to verifying analog page integrity 158 of FIG. 6. The first step in verifying finishing station process correctness 252, like the scenario of FIG. 6, is to start the printjob 160. As shown in FIG. 11, verifying finishing station process correctness 252 continues in a manner similar to the scenario of FIG. 6, including the converting and rendering of normalized pages to bitmap pages and control strings 164 and synchronizing each bitmap page and its corresponding control string 170. Continuing in a manner similar to the scenario of FIG. 6, the print controller advances the bitmap page along the image channel to the print engine 174 and the print engine performs its operations. Once print engine operations are completed, the print engine advances the analog page along the image channel to the finishing station 188 and the print controller sends the corresponding control string via the control channel to the finishing station 254, not necessarily in that order. The substantive steps of verifying finishing station process correctness 252 begin with step 254. In the scenario being described, the control string 40 contains an embedded command directing the finishing station 48 to perform its function in a certain manner and the finishing station 48 includes the control string interpreter 122 of FIG. 4c which permits it to interpret the command. The control string interpreter 122 interprets the control string finishing station command 256 and, accordingly, the finishing station performs its function. In an alternate embodiment, the print controller 14 may command the finishing station 48 to perform its function via separate control signals, permitting the finishing station 48 to operate whether or not it includes the control string interpreter 122. As a result of either embodiment, the finishing station accumulates the printed pages and prepares the finished document 258. Next, the finishing station verifies the correctness of the finishing operation 260 by sensing certain information as the finished document advances along the image channel 20 and comparing the measured information to the "truth" from the control string 40. For further details regarding the verification step (260), refer to the discussion above regarding the verification of process correctness 190 of FIG. 7. Still referring to FIG. 11, if the finishing operation is not correct, a mismatch is identified and the digital print system 10 implements corrective measures 262, including purging the mismatched document. If the correctness of the finishing operation is confirmed, the finishing station 48 advances the finished document along the image channel 20 to its final destination for automated operations which completes finishing operations. Once finishing operations are completed, the finished document is distributed 264 according to its required or desired distribution.

Referring to FIG. 12, where like numerals designate like components, a flow chart illustrates how sheet-specific setup commands 266 are provided to the print engine in accordance with the present invention. This scenario is nearly identical to verifying analog page integrity 158 of FIG. 6. The only distinction is that this scenario provides an additional step (i.e., step 268) where sheet-specific setup commands are interpreted from the control string by imaging stations within the print engine 46 prior to performing their respective imaging function on the bitmap page 38 or analog page 50 advancing through the print engine 46. More specifically, like the scenario of FIG. 6, the print controller 14 commands a feeding station to advance paper stock along the paper path 172, advances the bitmap page along the image channel to the print engine 174, and sends the control string via the control channel to the print engine 176. In the scenario being described, the control string 40 for the specific page to be printed contains embedded commands for changing the default xerographic set points for one or more imaging stations within the print engine 46. It is typically desirable to alter the default xerographic set points when unique content is to be printed on a specific page (e.g., a large picture) or when a unique target substrate is selected for printing (e.g., a transparency sheet). Accordingly, the imaging stations subject to the sheet-specific setup commands 266 include the control string interpreter 122 of FIG. 4c which permits them to interpret the commands. Therefore, after the control string 40 is sent to the print engine 176 and before the bitmap page 38 or analog page 50 is advanced to the imaging station subject to the embedded sheet-specific setup commands, the imaging station interprets the control string xerographic set point commands 268. As a result, the imaging station performs its function in accordance with the sheet-specific setup commands 266 rather than at its default xerographic set point. Like the scenario of FIG. 6, the analog page 50 continues along the image channel 20 and its correctness is verified at step 184. Verifying integrity of the analog page 184 confirms, inter alia, that the applicable imaging stations of the print engine 46 correctly performed according to the sheet-specific setup commands 266.

It is therefore apparent that, in accordance with the present invention, there has been described herein a system architecture for a digital print system and a method, utilizing such a system architecture, for verifying the correctness of various document processing processes within the digital print system. While this invention has been described in conjunction with several embodiments and several implementation scenarios, it is evident that many alternatives, modifications, and variations will be apparent to those skilled in the art. Accordingly, it is intended to embrace all such alternatives, modifications and variations that fall within the spirit and broad scope of the appended claims.

Having thus described several embodiments, the present invention is claimed to be:

1. A document processing system comprising:
   a controller for rendering image data for a document to be imaged in individual pages, wherein the unconverted image data for each individual page is dual and synchronously rendered in the controller to both a bitmap page ready for imaging by an image output terminal and a corresponding control string;
   an image output terminal for performing a plurality of processes to image the bitmap page and for verifying the correctness of one or more of such processes using the control string, and wherein the verifying occurs subsequent to the image data being synchronously rendered to the bitmap page and the control string;

an image channel for communicating the bitmap page from the controller to the image output terminal; and a control channel for communicating the control string from the controller to the image output terminal.

2. A document processing system comprising:

a controller for rendering image data for a document to be imaged in individual pages, wherein each individual page is rendered to a bitmap page and a corresponding control string;

an image output terminal for performing a plurality of processes to image the bitmap page and for verifying the correctness of one or more of such processes using the control string;

an image channel for communicating the bitmap page from the controller to the image output terminal; and a control channel for communicating the control string from the controller to the image output terminal;

wherein the controller includes a caching and synchronization process for synchronizing the control string with the bitmap page within the image output terminal antecedent to the image output terminal verifying the correctness of any one of the processes using the control string.

3. A document processing system comprising:

a controller for rendering image data for a document to be imaged in individual pages, wherein each individual page is rendered to a bitmap page and a corresponding control string;

an image output terminal for performing a plurality of processes to image the bitmap page and for verifying the correctness of one or more of such processes using the control string;

an image channel for communicating the bitmap page from the controller to the image output terminal; and a control channel for communicating the control string from the controller to the image output terminal;

wherein the controller includes a caching and synchronization process for synchronizing the control string with the bitmap page within the image output terminal in order for the image output terminal to use the control string to control the performance of any one of the processes.

4. The document processing system as set forth in claim 3, wherein the image output terminal includes at least one comparator circuit for communicating a confirmation of process correctness to the controller after verifying the correctness of one or more of the processes using the control string.

5. The document processing system as set forth in claim 3, wherein the image output terminal includes at least one finishing station for collecting the individual pages of the document after the bitmap page is imaged, for performing one or more finishing processes on the document, and for verifying the correctness of one or more of such processes using the control string.

6. The document processing system as set forth in claim 3, wherein the image output terminal includes an archive process station for archiving the bitmap pages and the control strings of the document for storage and subsequent retrieval.

7. A digital print system comprising:

a print controller for rendering image data for a document to be printed in individual pages, wherein each individual page is rendered to a bitmap page and a corresponding control string;

an image output terminal for performing a plurality of processes to print the bitmap page and for verifying the correctness of one or more of such processes using the control string, wherein the image output terminal is further comprising;

a plurality of process stations for performing the plurality of processes, wherein:

at least one process station is for converting the bitmap page to an analog page; and at least one process station is for verifying the correctness of one or more process stations using the control string;

an image channel for communicating the bitmap page from the print controller to the image output terminal and for communicating the bitmap page or analog page through the plurality of process stations; and a control channel for communicating the control string from the print controller to the image output terminal and to the one or more process stations;

wherein the print controller includes a caching and synchronization process for synchronizing the control string with the bitmap page or the analog page representation of the bitmap page within any process station antecedent to the process station verifying the correctness of one or more process stations using the control string.

8. A digital print system comprising:

a print controller for rendering image data for a document to be printed in individual pages, wherein each individual page is rendered to a bitmap page and a corresponding control string;

an image output terminal for performing a plurality of processes to print the bitmap page and for verifying the correctness of one or more of such processes using the control string, wherein the image output terminal is further comprising;

a plurality of process stations for performing the plurality of processes, wherein:

at least one process station is for converting the bitmap page to an analog page; and at least one process station is for verifying the correctness of one or more process stations using the control string;

an image channel for communicating the bitmap page from the print controller to the image output terminal and for communicating the bitmap page or analog page through the plurality of process stations; and a control channel for communicating the control string from the print controller to the image output terminal and to the one or more process stations;

wherein the print controller includes a caching and synchronization process for synchronizing the control string with the bitmap page or analog page within any process station in order for the process station to use the control string to control the performance of the process station.

9. The digital print system as set forth in claim 7, wherein at least one process station for verifying process correctness includes a comparator circuit for communicating a confirmation of process integrity to the print controller after verifying the correctness of one or more process stations using the control string.

10. The digital print system as set forth in claim 7, wherein the image output terminal is further comprised of:

one or more feeding process stations for advancing a page of stock from a supply source along a paper path, a print engine for receiving the bitmap page advancing along the image channel from the print controller, for converting the bitmap page to an analog page, for receiving the page of stock advancing along the paper path from the feeding process station, for transferring the analog page to the page of stock, and for advancing the transferred analog page along the image channel; and one or more finishing process stations for receiving the analog page advancing along the image channel from the print engine, for collecting each page of the document, and for performing one or more finishing processes on the document in preparation for distribution.

11. The digital print system as set forth in claim 7, wherein the image output terminal includes an archive process station for archiving the bitmap pages and the control strings of the document for storage and subsequent retrieval.

12. A method for verifying process correctness in a document processing system comprising the following steps:
   a) rendering image data for a document to be imaged in individual pages, where each individual page is rendered to a bitmap page and a corresponding control string;
   b) advancing the bitmap page to an image output terminal;
   c) performing a plurality of processes within the image output terminal to image the bitmap page;
   d) advancing the control string to the image output terminal;
   e) synchronizing the control string with the imaged bitmap page within the image output terminal;
   f) verifying the integrity of the imaged bitmap page within the image output terminal using the control string.

13. The method of claim 12, wherein step e) further includes the steps:
   f) sensing at least a portion of the imaged bitmap page;
   g) comparing the sensed portion of the imaged bitmap page to a corresponding reference in the control string; and
   h) producing a signal indicating that the imaged bitmap page matches its corresponding reference in the control string.

14. The method of claim 12, further including the step:
   f) providing a signal to a controller indicating that the integrity of the imaged bitmap page has been confirmed.

15. The method of claim 12, further including:
   g) advancing a page of stock from a supply source within the image output terminal to a transferring process station within the image output terminal;
   wherein step d) further includes the steps:
   h) advancing the control string to a feeding process station in the image output terminal, where the feeding process station is responsible for advancing the page of stock; and
   i) synchronizing the control string with the advancing of the page of stock at the feeding process station;
   wherein step e) further includes the steps:
   j) sensing an identifying characteristic from the page of stock;
   k) comparing the sensed characteristic from the page of stock to a corresponding reference in the control string; and
   l) providing a signal to a controller indicating that the correctness of the page of stock has been confirmed.

16. A method for setting up one or more imaging process stations in a digital print system comprising the following steps:
   a) rendering image data from a pre-established set of test targets to be printed in individual pages, where each individual page is rendered to a bitmap page and a corresponding control string;
   b) advancing the bitmap page through a plurality of imaging process stations in an image output terminal to convert it to an analog page and to transfer the analog page to a page of stock;
   c) advancing and synchronizing the control string with the analog page representation of the bitmap page at any one imaging process station antecedent to the imaging process station verifying the correctness of one or more test targets using the control string;
   d) verifying the correctness of one or more test targets in the analog page representation of the bitmap page at any one imaging process station within the image output terminal using the control string;
   e) providing a signal to a print controller indicating that the correctness of the test targets in the analog page have been confirmed;
   f) if the correctness of the test targets are not confirmed, advancing a control string to one or more imaging process stations in the image output terminal to control such imaging process stations in order to correct for a mismatch between the test targets and the control string and repeating steps a) through e); and
   g) repeating steps a) through f) for additional individual pages until verification of the correctness of all test targets in the set of test targets is confirmed.

17. A method for verifying process correctness in a document processing system comprising the following steps:
   a) rendering image data for a document to be imaged in individual pages, where each individual page is rendered to a bitmap page and a corresponding control string;
   b) advancing the bitmap page to an image output terminal;
   c) performing a plurality of processes within the image output terminal to image the bitmap page, wherein the plurality of processes includes advancing a page of stock from a supply source within the image output terminal to a transferring process station within the image output terminal;
   d) advancing the control string to the image output terminal and to a feeding process station in the image output terminal, where the feeding process station is responsible for advancing the page of stock;
   e) synchronizing the control string with the advancing of the page of stock at the feeding process station; and
   f) verifying the integrity of the imaged bitmap page within the image output terminal using the control string.

18. The method of claim 17, step f) further including the steps:
   g) sensing an identifying characteristic from the page of stock;
   h) comparing the sensed characteristic from the page of stock to a corresponding reference in the control string; and
   i) providing a signal to a controller indicating that the correctness of the page of stock has been confirmed.

19. A method for verifying process correctness in a document processing system comprising the following steps:

a) rendering image data for a document to be imaged in individual pages, where each individual page is rendered to a bitmap page and a corresponding control string;
b) advancing the bitmap page to an image output terminal;
c) performing a plurality of processes within the image output terminal to image the bitmap page, wherein the plurality of processes includes i) converting the bitmap page to an analog page and advancing the analog page to a transferring process station within the image output terminal, ii) advancing a page of stock from a supply source within the image output terminal to the transferring process station, and iii) transferring the analog page to the page of stock at the transferring process station;
d) advancing the analog page to a finishing process station within the image output terminal;
e) performing a finishing process on the document at the finishing process station;
f) advancing the control string to the finishing process station;
g) synchronizing the control string with the performance of the finishing process at the finishing process station; and
h) verifying the integrity of the imaged bitmap page within the image output terminal using the control string.

20. The method of claim 19 wherein steps a) through h) are repeated for each page of the document.

21. The method of claim 19, step h) further including the steps:

i) sensing an identifying characteristic of the finishing process from the document;
j) comparing the sensed characteristic from the document to a corresponding reference in the control string; and
k) providing a signal to a controller indicating that the integrity of the document has been confirmed.

* * * * *